(12) United States Patent
Chino et al.

(10) Patent No.: US 6,293,022 B1
(45) Date of Patent: *Sep. 25, 2001

(54) MOUNTING STRUCTURE FOR WHEEL ANGLE DETECTOR AND ROTATION AMOUNT DETECTOR FOR VEHICLE WHEEL

(75) Inventors: Kenji Chino; Masaya Hyodo; Yoshihisa Iwanaga, all of Kariya (JP)

(73) Assignee: Kabushiki Kaisha Toyoda Jidoshokki Seisakusho, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,440

(22) Filed: Apr. 16, 1998

(30) Foreign Application Priority Data

| Apr. 25, 1997 | (JP) | 9-109303 |
|---|---|---|
| May 12, 1997 | (JP) | 9-121054 |
| May 13, 1997 | (JP) | 9-122233 |

(51) Int. Cl.$^7$ ............................. G01B 5/255; G01B 7/315

(52) U.S. Cl. ....................................... 33/203.18; 33/1 PT

(58) Field of Search .................... 33/1 N, 1 PT, 33/203, 203.18, 336, 337, 534, 600

(56) References Cited

U.S. PATENT DOCUMENTS

| 2,077,082 | * | 4/1937 | Wedlake | 33/337 |
|---|---|---|---|---|
| 3,782,831 | * | 1/1974 | Senften | 33/337 |
| 4,530,155 | * | 7/1985 | Burkhardt et al. | 33/1 PT |
| 4,637,488 | | 1/1987 | Fotheringham et al. | |
| 5,636,703 | | 6/1997 | Papke et al. | |
| 5,855,072 | * | 1/1999 | Nakaho | 33/1 PT |

FOREIGN PATENT DOCUMENTS

| 24 36 126 | * | 2/1975 | (DE) | 33/1 PT |
|---|---|---|---|---|
| 39 03 359 A1 | | 8/1990 | (DE) | |
| 0184997 A1 | | 6/1986 | (EP) | |
| 0330632 A1 | | 8/1989 | (EP) | |
| 0 423 080 A1 | | 4/1991 | (EP) | |
| 521254 | * | 1/1993 | (EP) | 33/1 N |
| 2639708 | * | 6/1990 | (FR) | 33/1 PT |
| 2 079 464 A | | 1/1982 | (GB) | |
| 1-110322 | | 7/1989 | (JP) | |
| 424270 | | 4/1992 | (JP) | |
| 08101033A | | 4/1996 | (JP) | |
| 1106776A | | 8/1984 | (SU) | |

OTHER PUBLICATIONS

Patent Abstracts of Japan, Publication No. 02254069, Published Oct. 12, 1990.

Patent Abstracts of Japan Publication No. 04224471, published Aug. 13, 1992.

* cited by examiner

*Primary Examiner*—G. Bradley Bennett
(74) *Attorney, Agent, or Firm*—Morgan & Finnegan, L.L.P.

(57) ABSTRACT

A device for detecting the wheel angle of forklift rear wheels is disclosed. A cylinder steers the rear wheels by means of steering mechanisms based on manipulation of a steering wheel. The steering mechanisms include kingpins that support the rear wheels to be rotatable in relation to a rear axle. Each kingpin rotates integrally with the corresponding rear wheel. A wheel angle sensor, which includes a potentiometer, is fixed to the rear axle by a bracket. The position of the sensor corresponds to the position of one of the kingpins. The sensor detects the rotational angle of the kingpin as the wheel angle of the rear wheels.

20 Claims, 16 Drawing Sheets

MOUNTING STRUCTURE FOR WHEEL ANGLE DETECTOR AND ROTATION AMOUNT DETECTOR FOR VEHICLE WHEEL

BACKGROUND OF THE INVENTION

The present invention relates to a device that detects the wheel angle of an industrial vehicle such as a forklift. More particularly, the present invention pertains to a structure for installing a wheel angle detector at a predetermined position.

The body frame of a typical forklift is prevented from being excessively tilted with respect to the rear axle by centrifugal force generated during turning. Specifically, the tilting, or swing amount, of the rear axle is controlled during a turn of the vehicle based, for example, on the vehicle speed and the angle of the steered wheels. Japanese Examined Patent Publication No. 4-24270 discloses a method for detecting the angle of the steered wheels of a forklift.

The forklift disclosed in the publication includes a power steering apparatus. The power steering apparatus has a steering shaft, which is rotated by manipulation of a steering wheel, and a valve unit coupled to the steering shaft. The valve unit supplies hydraulic oil to and drains hydraulic oil from a cylinder in accordance with rotation of the steering shaft. The cylinder has a pair of piston rods protruding from its sides. Each piston rod is coupled to a vehicle wheel. Hydraulic oil from the valve unit moves the piston rods. Accordingly, the piston rods steer the wheels. The moving amount of the piston rods is detected by a stroke sensor. The angle of the wheels is computed based on the value detected by the stroke sensor.

In another method for detecting the angle of steered wheels, linear movement of piston rods in a cylinder is converted into rotation by a converter such as a link mechanism. This rotation is detected by a potentiometer. The angle of the steered wheels is detected based on the value detected by the potentiometer.

The first method, in which the movement of piston rods is detected by a stroke sensor, complicates the computation of the wheel angle. Moreover, since the stroke sensor is expensive, the first method is costly. In the latter method, where linear movement of piston rods is converted into rotation and is detected by a potentiometer, the potentiometer is relatively inexpensive and thus reduces the cost. However, this method requires a converter such as a link for converting movement of the piston rods to rotation. This increases the number of parts and complicates the installation of the apparatus. Further, if the converter is not assembled accurately, the detection of the wheel angle will be inaccurate.

SUMMARY OF THE INVENTION

Accordingly, it is an objective of the present invention to provide a wheel angle detector that has a simple and inexpensive construction and accurately detects the angle of vehicle wheels.

Another objective of the present invention is to provide a mounting structure for accurately installing a rotation amount detector that is suitable for the above wheel angle detector.

To achieve the foregoing and other objectives and in accordance with the purpose of the present invention, an apparatus for detecting a wheel angle of a vehicle wheel is proved in a first aspect of the present invention. The vehicle has a manipulating member, an actuator and a steering mechanism. The actuator steers the vehicle wheel with the steering mechanism based on manipulation of the manipulating member. The steering mechanism has a rotating member that rotates in synchronization with the steering of the vehicle wheel. The apparatus includes a detector for detecting a rotation amount of the rotating member as a wheel angle of the vehicle wheel.

In a second aspect of the present invention, a mounting structure of a detector that detects a rotation amount of a rotating member is provided. The rotating member is rotatably supported by a hole formed in a support. The detector is attached to the support to be operably coupled to the rotating member. A positioning member is located between the support and the detector for fixing the position of the detector in relation to the rotating member.

In a third aspect of the present invention, a mounting structure of a detector that detects a rotation amount of a rotating member is provided. The rotating member is rotatably supported by a hole formed in a support. The detector is attached to the support to extend through the hole and to be operably coupled to the rotating member. A bearing is located between the hole and the rotating member. A space is defined in the hole for containing lubricant supplied to the bearing. A seal is provided in the hole for separating the lubricant from the detector.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A wheel angle sensor and its mounting structure according to a first embodiment of the present invention will be described with reference to FIGS. 1 to 9. The sensor is used in industrial vehicles, primarily in forklifts.

Figure 6:
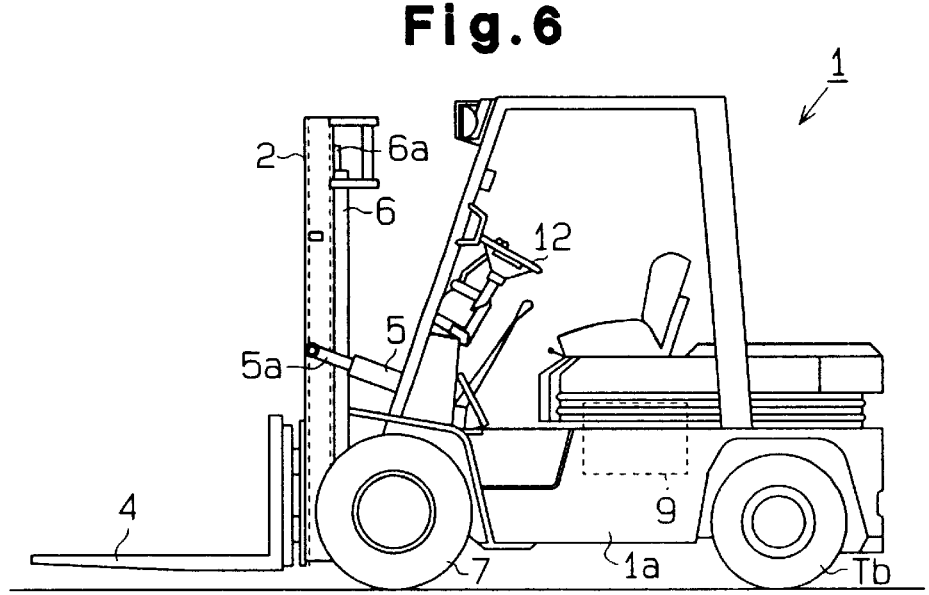
FIG. 6 is a side view illustrating a forklift on a wheel angle sensor of FIG. 1 may be installed.

FIG. 6 is a side view of a forklift 1. The forklift 1 has a body frame 1a, driven front wheels 7 and steered rear wheels Ta, Tb. A pair of outer masts 2 are arranged on the front of the body frame 1a. A pair of inner masts (not shown) are arranged between the outer masts 2. A fork 4 is coupled to each inner mast by a chain (not shown). The forks 4, together with the inner masts, are lifted and lowered. Each outer mast 2 is coupled with the body frame 1a by a tilt cylinder 5. Specifically, each cylinder 5 includes a piston rod 5a, and the distal end of each piston rod 5a is coupled to the corresponding outer mast 2. The tilt cylinders 5 extend and draw the piston rods 5a thereby inclining the outer masts 2. A lift cylinder 6 is located on the inner side of each outer mast 2. Each lift cylinder 6 includes a piston rod 6a, which is coupled to the top end of the corresponding inner mast. The lift cylinders 6 extend and retract the piston rods 6a thereby lift and lower the forks 4. Each front wheel 7 is connected to an engine 9 by a differential ring gear (not shown) and a transmission (not shown). Thus, the front wheels 7 are driven by the engine 9.

A power steering apparatus 10 mounted on the forklift 1 will now be described with reference to FIG. 7. The apparatus 10 includes a steering wheel 12. The steering wheel 12 has a knob 12a. When turning the forklift 1, an operator holds the knob 12a and rotates the steering wheel 12. The steering wheel 12 is coupled to a steering shaft 13. The steering shaft 13 is rotated by an amount corresponding to the rotation amount of the steering wheel 12. The steering shaft 13 is coupled to a valve unit 14, which is designed for power steering apparatuses.

A supply passage 16 and a drain passage 18 are connected to the valve unit 14. Hydraulic oil in a tank 17 is supplied to the supply passage 16 by the hydraulic pump 15. Hydraulic oil is also returned to the tank 17 from the valve unit 14 via the drain passage 18. The valve unit 14 is connected to a steering cylinder 20 by a first oil pipe K1 and a second oil pipe K2. The valve unit 14 supplies oil to and drains oil from the cylinder 20 through the pipes K1, K2. As the cylinder 20 receives and drains oil, the cylinder 20 steers the rear wheels Ta, Tb. The valve unit 14 supplies oil to the cylinder 20 through the first pipe K1 or the second pipe K2. The amount of the supplied oil corresponds to the rotation amount of the steering shaft 13.

The cylinder 20 has a housing 21 and a piston 22 housed in the housing 21. The piston 22 divides the interior of the housing 21 into a first chamber R1 and a second chamber R2. A piston rod 23a is secured to one end of the piston 22 and extends to the outside of the housing 21. Likewise, another piston rod 23b is secured to the opposite end of the piston 22 and extends to the outside of the housing 21. The distal end of the piston rod 23a is coupled to the rear wheel Ta by a link mechanism 24a, and the distal end of the piston rod 23b is coupled to the rear wheel Tb by a link mechanism 24b. The rear wheels Ta, Tb are pivotally supported by king pins 25a, 25b, respectively.

The first pipe K1 is connected to the first chamber R1, and the second pipe K2 is connected to the second chamber R2. When the valve unit 14 supplies hydraulic oil to the first chamber R1 through the first pipe K1, the piston 22 is moved leftward (as viewed in FIG. 7). Accordingly, the piston rods 23a, 23b are moved leftward and steer the rear wheels Ta, Tb about the kingpins 25a, 25b clockwise as viewed in FIG. 7. Meanwhile, hydraulic oil in the second chamber R2 is returned to the valve unit 14 through the second pipe K2. The oil is then led to the tank 17 by the drain passage 18. When the rear wheels Ta, Tb are steered clockwise in FIG. 7, the forklift 1 turns to the left.

Figure 7:
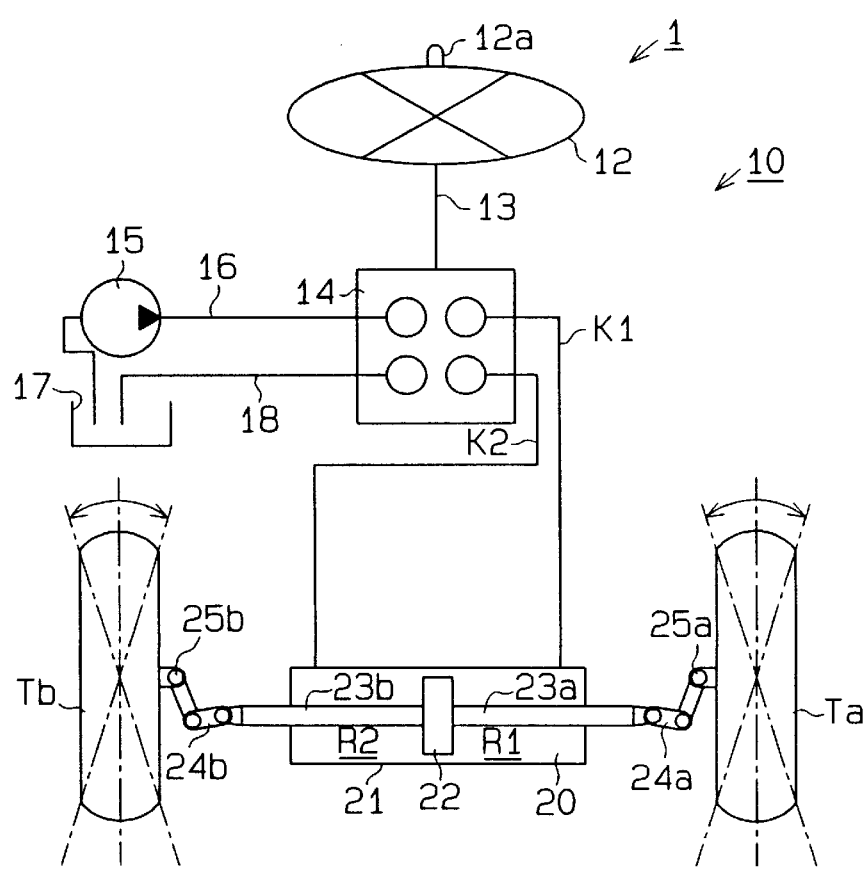
FIG. 7 is a diagrammatic view showing the steering apparatus of the forklift of FIG. 6.

Contrarily, when the valve unit 14 supplies hydraulic oil to the second chamber R2 through the second pipe K2, the piston 22 is moved rightward as viewed in FIG. 7. Accordingly, the piston rods 23a, 23b are moved rightward and steer the rear wheels Ta, Tb about the kingpins 25a, 25b counterclockwise as viewed in FIG. 7. Meanwhile, hydraulic oil in the first chamber R1 is returned to the valve unit 14 through the second pipe K2. The oil is then led to the tank 17 by the drain passage 18. When the rear wheels Ta, Tb are steered counterclockwise in FIG. 7, the forklift 1 turns to the right.

Figure 8:
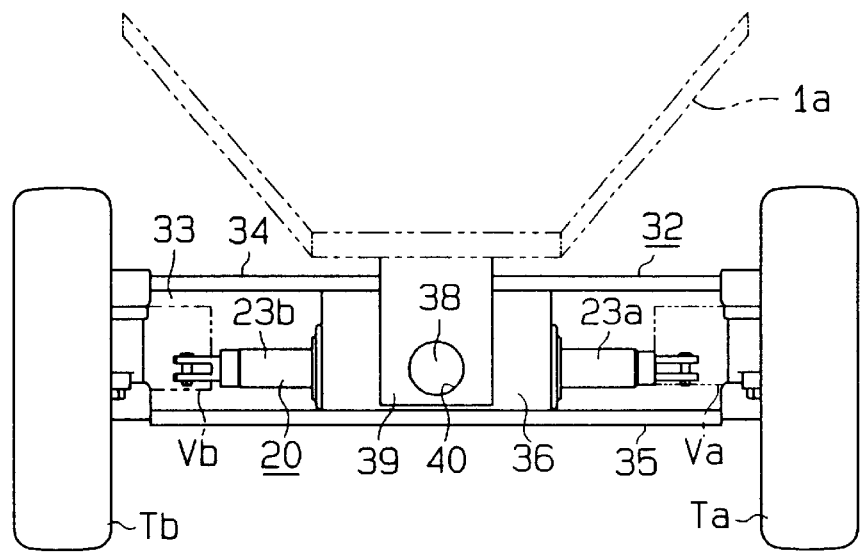
FIG. 8 is a rear view illustrating a rear axle of the forklift of FIG. 6.
Figure 9:
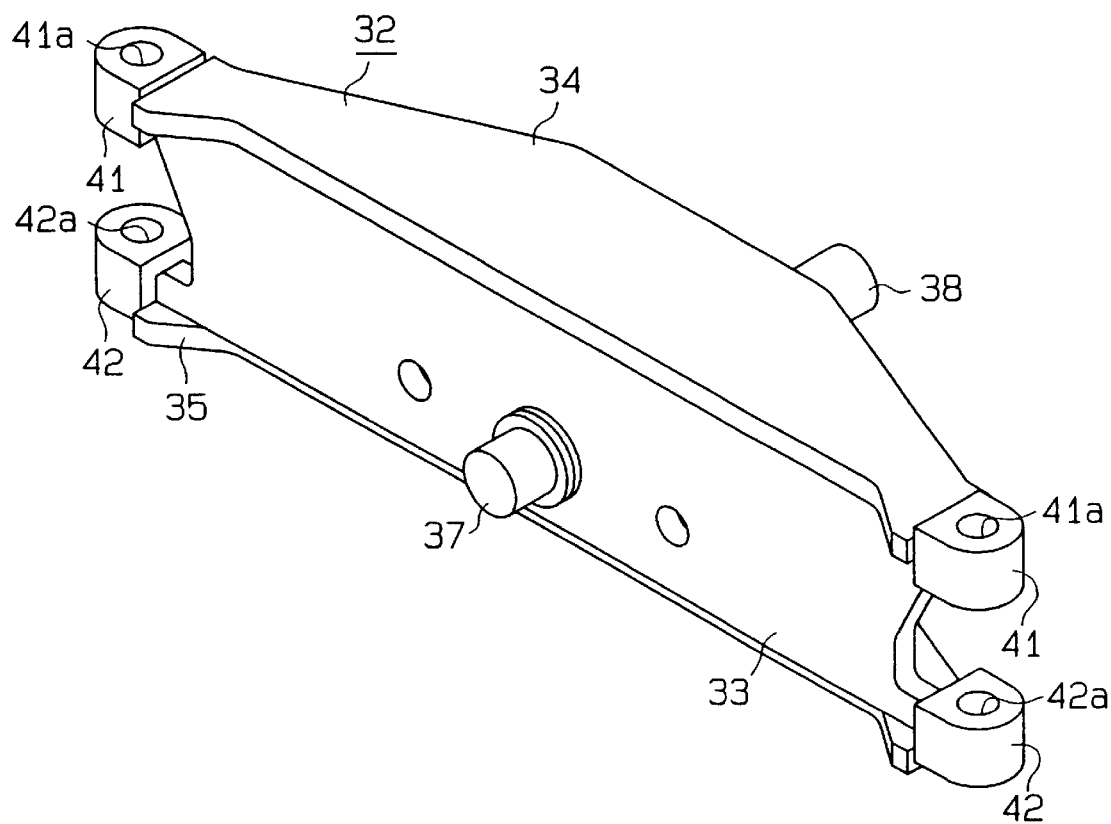
FIG. 9 is a perspective view illustrating the rear axle of FIG. 8.

The arrangement of the power steering apparatus 10 will now be described. As shown in FIGS. 8 and 9, a rear axle 32 extends laterally through the lower portion of the body frame 1a. The rear axle 32 includes a base plate 33, an upper plate 34 and a lower plate 35. The upper plate 34 and the lower plate 35 are arranged on the top and the bottom of the base plate 33 to face each other. A connecting plate 36 is located behind the base plate 33 for coupling the upper plate 34 with the lower plate 35. A cylindrical center pin 37 is located in the center of the base plate 33 and extends forward. Similarly, another center pin 38 is located in the center of the base plate 33 and extends rearward.

A pair of supporting leaves 39 protrude downwardly from the bottom of the body frame 1a. The leaves 39 hold the rear axle 32 such that the rear axle 32 is in between the leaves 39. Each leaf 39 includes a circular bore 40. The rear axle 32 is pivotally connected to the body frame 1a by inserting the center pins 37, 38 in the bores 40. As the forklift 1 runs over bumps and dips on the road surface, the rear axle 32 pivots with respect to the body frame 1a thereby lessening the tilting of the vehicle body.

As illustrated in FIG. 8, the rear axle 32 houses the cylinder 20. The housing 21 of the cylinder 20 is secured to the base plate 33 by bolts (not shown). The distal ends of the piston rods 23a, 23b are coupled to the rear wheels Ta, Tb by steering mechanisms Va, Vb. The steering mechanism Va includes the link mechanism 24a and the kingpin 25a, and the steering mechanism Vb includes the link mechanism 24b and the kingpin 25b.

Figure 3:
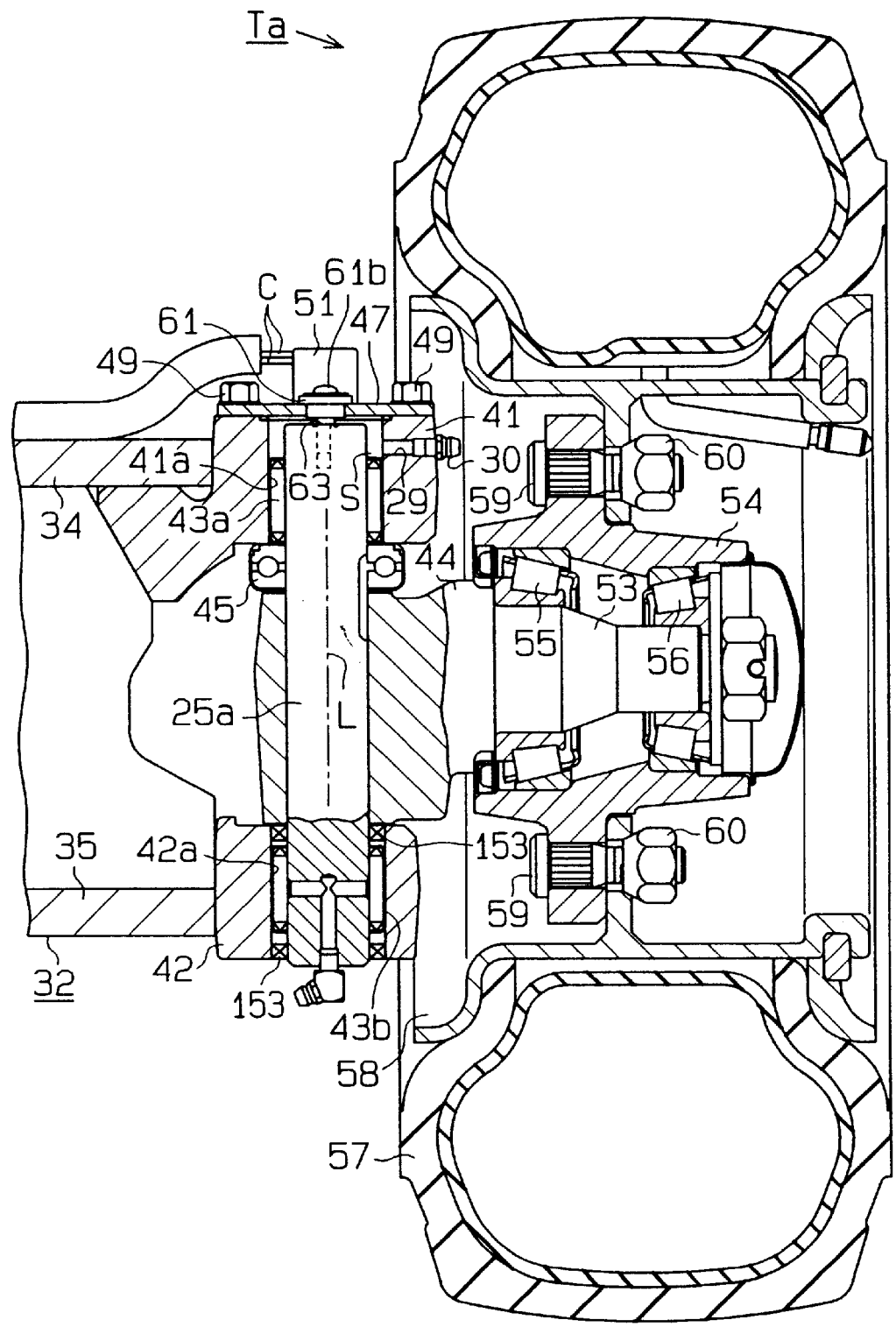
FIG. 3 is a cross-sectional view illustrating a rear wheel of a forklift.

The wheel angle sensor mounting structure will now be described. The wheel angle sensor 51 functions as a rotation amount detector. FIG. 3 is a cross-sectional view showing the rear wheel Ta. As illustrated in FIGS. 3 and 9, an upper support 41 is secured to each end of the upper plate 34, and a lower support 42 is secured to each end of the lower plate 35. Each upper support 41 has a support hole 41a, and each lower support 42 has a support hole 42a. The kingpin 25a is supported by the support holes 41a, 42a of the right supports 41, 42 with needle bearings 43a, 43b in between. A pair of dust seals 153 are located between the inner wall of the support hole 42a and the kingpin 25a. The dust seals 153 are located above and below the needle bearing 43b to sandwich the bearing 43b.

As shown in FIG. 3, a steering knuckle 44 is fixed to the middle of the kingpin 25a. The steering knuckle 44, which rotates integrally with the kingpin 25a, constitutes a part of the steering mechanism Va. The knuckle 44 is coupled to the piston rod 23a of the cylinder 20 by the link mechanism 24a. Thus, linear movement of the piston rod 23a causes the steering knuckle 44 to pivot integrally with the kingpin 25a about the axis L of the pin 25a. A thrust bearing 45 is provided about the kingpin 25a between the steering knuckle 44 and the upper support 41. The thrust bearing 45 allows the knuckle 44 to rotate relative to the upper support 41.

A shaft 53 is integrally formed with the knuckle 44 and extends horizontally in the lateral direction of the vehicle. A generally cylindrical hub 54 is rotatably fitted to the shaft 53 with a pair of roller bearings 55, 56 in between. The rear wheel Ta includes a wheel body 58 and a tire 57 fitted about the wheel body 58. The wheel body 58 is fixed to the hub 54 by pairs of bolts 59 and nuts 60. The rear wheel 53 is therefore rotatably supported by the rear axle 53. The rear wheel Ta is also steered integrally with the knuckle 44 and the kingpin 25a about the axis L of the kingpin 25a.

The kingpin 25b is rotatably supported by the support holes 41a, 42a of the left upper and left lower supports 41, 42 with the needle bearings 43a, 43b. The mounting structure of the left rear wheel Tb is substantially the same as that of the right rear wheel Ta illustrated in FIG. 3, except for the wheel angle sensor 51 located on top of the king pin 25a. Therefore, the mounting structure of the left rear wheel Tb is neither illustrated nor described.

Figure 1:
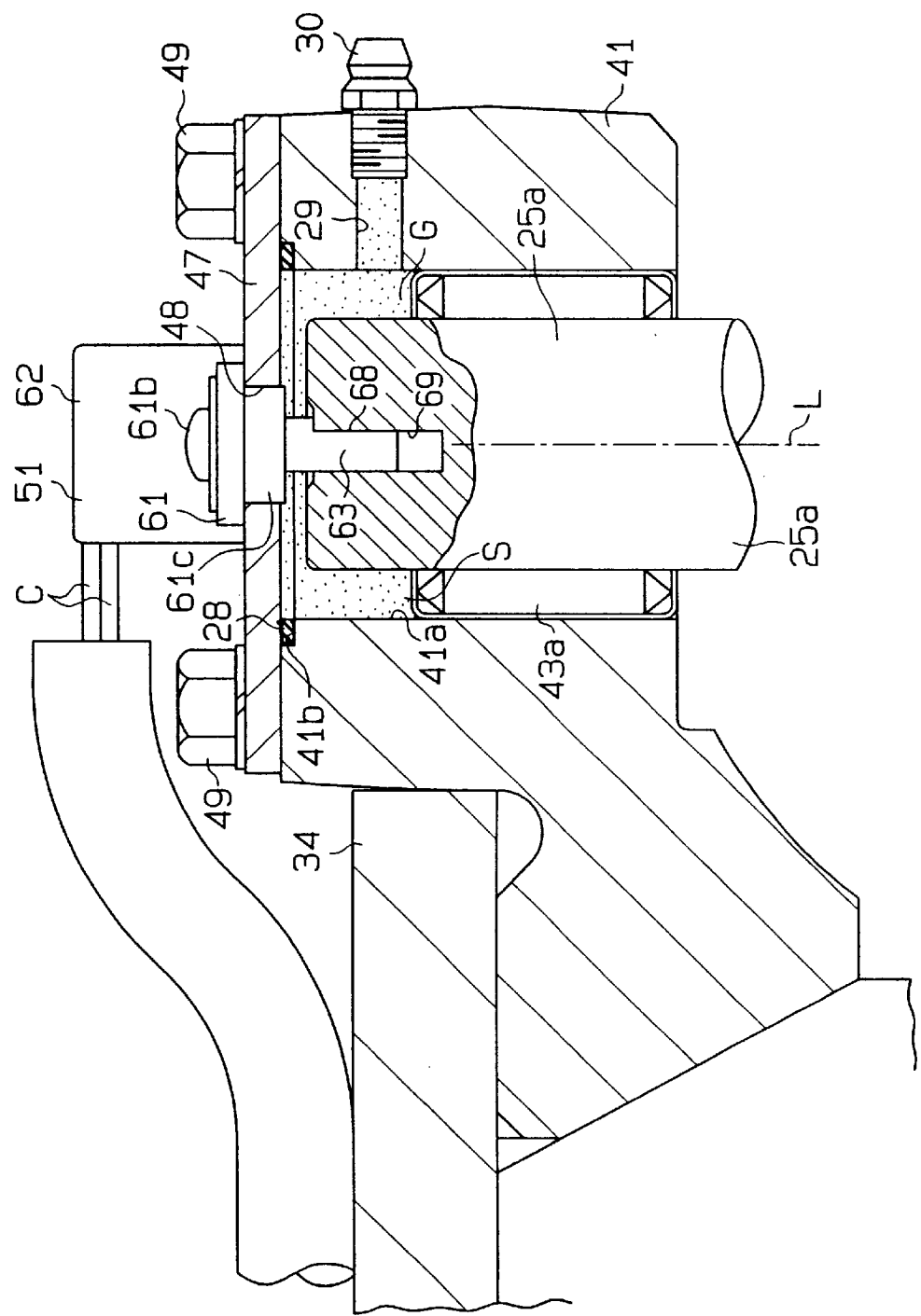
FIG. 1 is an enlarged partial cross-sectional view illustrating a wheel angle sensor and its mounting structure according to a first embodiment of the present invention.
Figure 2:
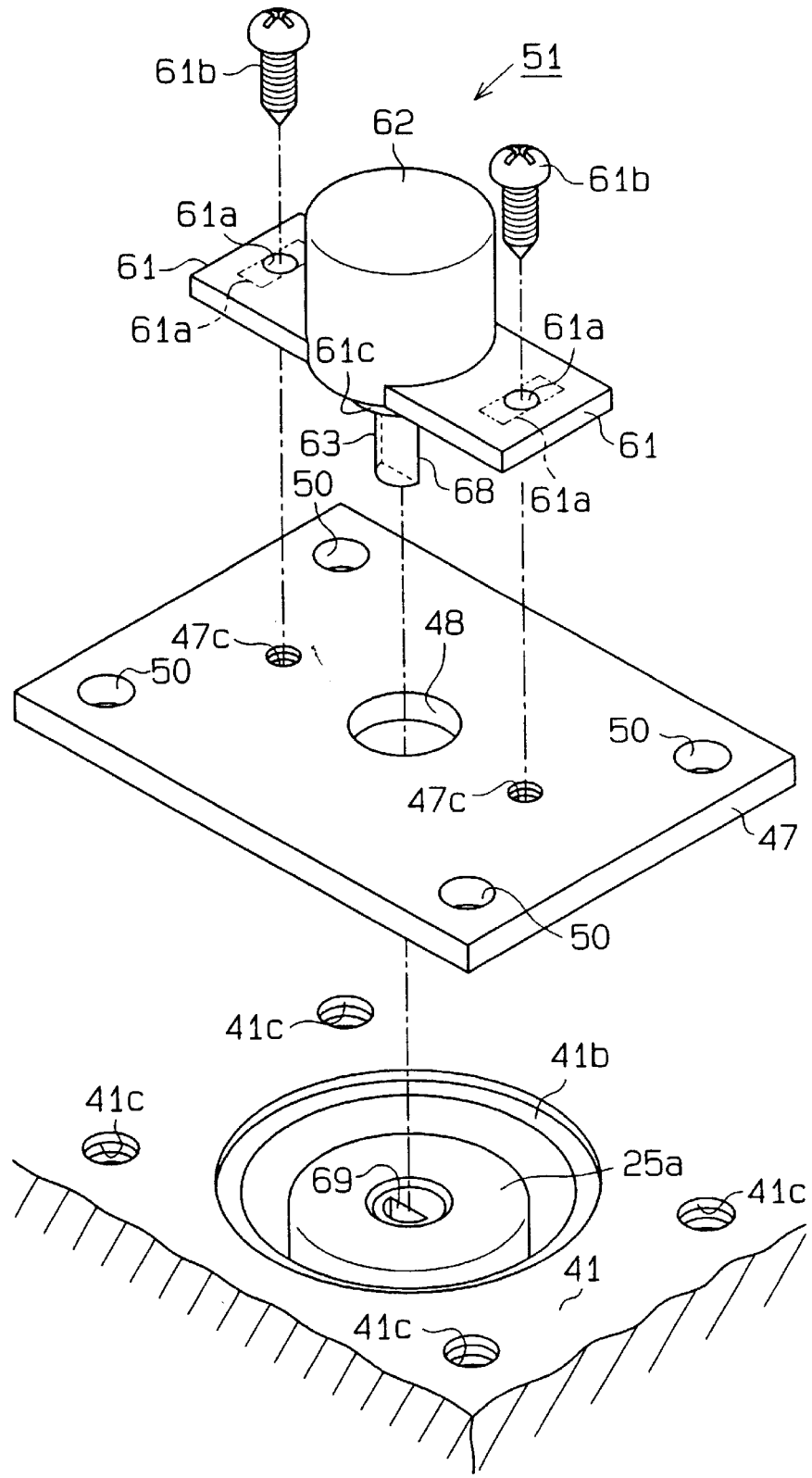
FIG. 2 is an exploded perspective view illustrating the sensor of FIG. 1.

As shown in FIGS. 1 to 3, a plate bracket 47 is secured to the top of the upper support 41 by bolts 49. The bracket 47 is, for example, die casted from aluminum and has a circular positioning hole 48 in its center. Bolt holes 50 are formed in the four corners of the bracket 47. Threaded holes 41c are formed on the top surface of the upper support 41. Each hole 41c corresponds to one of the bolt holes 50. The bolts 49 are screwed to the threaded holes 41c through the bolt holes 50. A step 41b is formed in the upper end of the support hole 41a of the upper support 41. A seal 28 is fitted in the step 41b. The seal 28 is pressed against the bottom side of the bracket 47 for sealing the upper end of the support hole 41a. The seal 28 prevents water and other substance from entering the interior of the support hole 41a through between the bracket 47 and the upper surface of the upper support 41.

As shown in FIG. 1, the top of the kingpin 25a, the needle bearing 43a and the bracket 47 define a space S in the interior of the support hole 41a. The space S is communicated with the outside by a filling hole 29 formed in the upper support 41. A nipple 30 is screwed to the opening of the hole 29. Grease G is forced into the space S through the nipple 30. The grease G lubricates the bearing 43a.

As shown in FIGS. 1 and 2, the wheel angle sensor 51 is attached to the bracket 47. The wheel angle sensor 51 includes a potentiometer, which has a cylindrical housing 62. A pair of securing leaves 61 protrude laterally from the lower portion of the housing 62. Each leaf 61 has a bolt hole 61a. The holes 61a may be elongated as illustrated by double-dotted lines in FIG. 2. The housing 62 includes a protrusion 61c formed on the bottom. The protrusion 61c is fitted to the positioning hole 48. Thereafter, bolts 61b are screwed to the bolt holes 47c in the bracket 47 through the holes 61a. Accordingly, the sensor 51 is fixed to the bracket 47.

Figure 5:
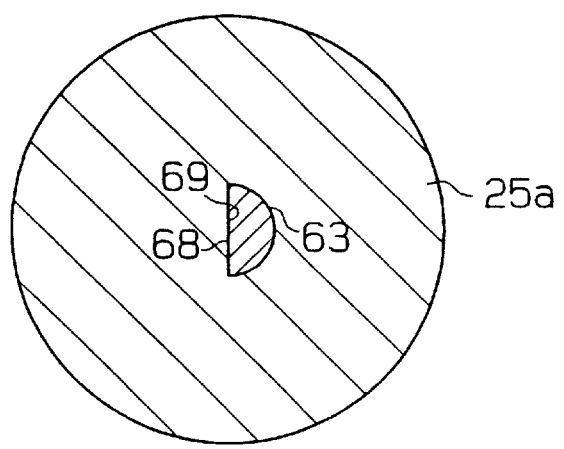
FIG. 5 is an enlarged cross-sectional view illustrating an input shaft of a sensor, which is engaged with a kingpin.

An input shaft 63 protrudes downward from the bottom of the protrusion 61c. Part of the lower portion is cut away from the shaft 63 to form a planar engaging surface 68. As shown in FIG. 5, a semi-circular hole 69 is formed in the top portion of the kingpin 25a. The lower portion of the shaft 63 is inserted into the hole 69 with the axis of the shaft 63 aligned with the axis L of the kingpin 25a. Therefore, the wheel angle sensor 51 is coaxial with the kingpin 25a. The shaft 63 is integrally rotated with the kingpin 25a.

Figure 4:
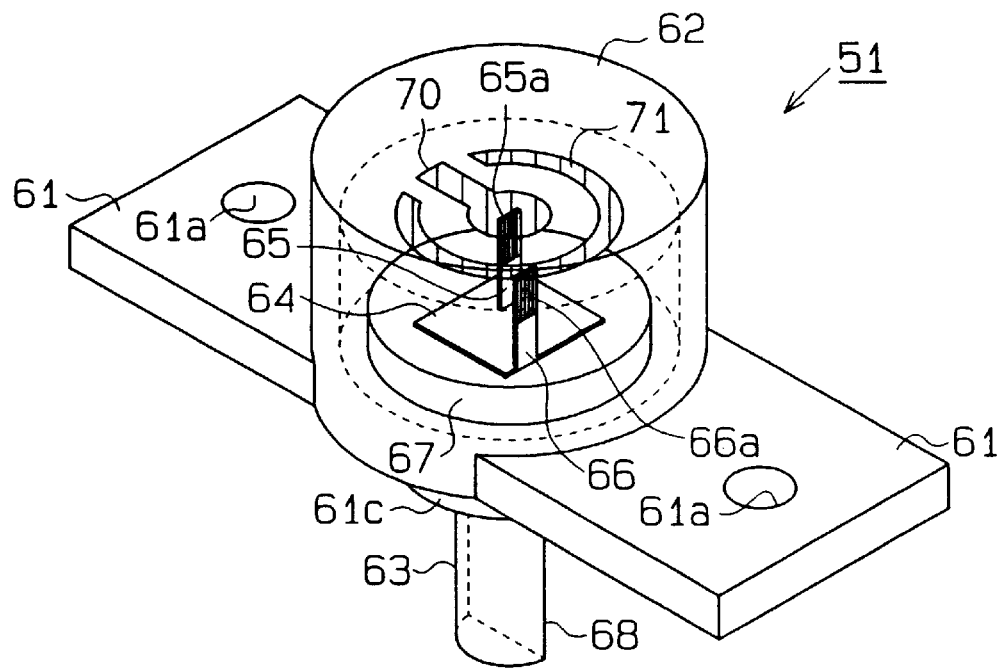
FIG. 4 is a partial perspective view showing an inner structure of the sensor of FIG. 1.

The inner construction of the wheel angle sensor 51 will now be described referring to FIG. 4. The housing 62 of the sensor 51 is made of an insulating material. A rotor 67 is rotatably located on the bottom plate of the housing 62. The shaft 63 is integrally formed with the rotor 67. The axis of the shaft 63 is aligned with that of the rotor 67. The shaft 63 is rotatably supported by a bearing (not shown) provided in the bottom plate of the housing 62 and protrudes downward from the protrusion 61c.

The top surface of the rotor 67 is coated with an insulating film (not shown). A conductive plate 64 is fixed to the insulating film. The conductive plate 64 has a first contact 65 and a second contact 66 protruding upward. The first contact 65 is located on the axis of the rotor 67, whereas the second contact 66 is offset from the axis of the rotor 67. As the rotor 67 rotates with the shaft 63, the second contact 66 moves along a circular path. The first contact 65 has a conductive brush 65a at its distal end. The second contact 66 also has a conductive brush 66a at its distal end.

A conductive piece 70 is fixed to the ceiling of the housing 62. The conductive piece 70 constantly contacts the brush 65a of the first contact 65. A resistor piece 71 is also fixed to the ceiling of the housing 62 about the conductive piece 70. The resistor piece 71 is C-shaped. The resistor piece 71 extends along the path of the second contact 66 and maintains contact with the brush 66a of the second contact 66. The value of resistance of the resistor piece 71 is higher than that of the conductive piece 70.

A pair of signal wires C are connected to the sensor 51. Specifically, one of the wires C is connected to one end of the conductive piece 70 and the other wire C is connected to one end of the resistor piece 71. The wires C are also connected to a controller (not shown). As the rotor 67 is rotated by the shaft 63, the brush 66a of the second contact 66 is moved along the resistor piece 71. The movement of the brush 66a along the resistor piece 71 changes the value of resistance between the wire C connected to the conductive piece 70 and the wire C connected to the resistor piece 71. The resistance value increases when the distance between the point where the brush 66a contacts the resistance piece 71 and the point where the wire C is attached to the resistance piece 71 increases. Similarly, the resistance value decreases when this distance decreases. The change of the resistance value alters the voltage of signals that are received by the controller. The controller obtains the rotational angle of the kingpin 25a, which rotates integrally with the shaft 63, based on the changes in the signal voltage. In other words, the controller obtains the angle of the rear wheel Ta.

If the operator rotates the steering wheel 12 counterclockwise, the power steering apparatus 10 steers the rear wheels Ta, Tb clockwise about the kingpins 25a, 25b. The steered amount of the rear wheels Ta, Tb corresponds to the rotation amount of the steering wheel 12.

Contrarily, if the operator rotates the steering wheel 12 clockwise, the power steering apparatus 10 steers the rear wheels Ta, Tb counterclockwise about the kingpins 25a, 25b by the amount corresponding to the rotation amount of the steering wheel 12.

When steered, the rear wheels Ta, Tb pivot integrally with the kingpins 25a, 25b. The wheel angle sensor 51 detects the rotation angle of one of the-kingpins (25a), or the angle of the rear wheel Ta, and sends a signal corresponding to the detected angle to the controller.

The embodiment of FIGS. 1 to 9 has the following advantages.

The wheel angle sensor 51, which includes a potentiometer, is located on the axis L of the kingpin 25a and detects the rotation angle of the kingpin 25a as the angle of the rear wheel Ta. Therefore, unlike the prior art, the wheel angle is detected without measuring the stroke distance of the piston rods 23a, 23b with a stroke sensor. This eliminates the need for a stroke sensor, which is fairly expensive. Instead, an inexpensive potentiometer is used in the device of FIGS. 1–9.

The input shaft 63 of the wheel angle sensor 51 is directly coupled to the kingpin 25a. In other words, nothing is located between the shaft 63 and the kingpin 25a. This simplifies the structure for detecting the wheel angle and eliminates dimensional errors, which would otherwise-be caused by assembling the kingpin 25a with the sensor 51.

Therefore, the rotation angle of the kingpin 25a is directly and accurately detected by the wheel angle sensor 51. That is, the wheel angle is accurately detected. Further, the construction of FIGS. 1–9 reduces the number of the parts in the sensor 51 and facilitates the assembly of the sensor 51 to the kingpin 25a.

The input shaft 63 may be coupled to the kingpin 25a with a rubber bushing in between.

The wheel angle sensor 51 may be directly attached to the upper support 41 without using the bracket 47. This method is effective when the support hole 41a in the support 41 is small.

A second embodiment of present embodiment will now be described with reference to FIG. 10. The differences from the embodiment of FIGS. 1–9 will mainly be discussed below, and like or the same reference numerals are given to those components that are like or the same as the corresponding components of the embodiment of FIGS. 1–9.

Figure 10:
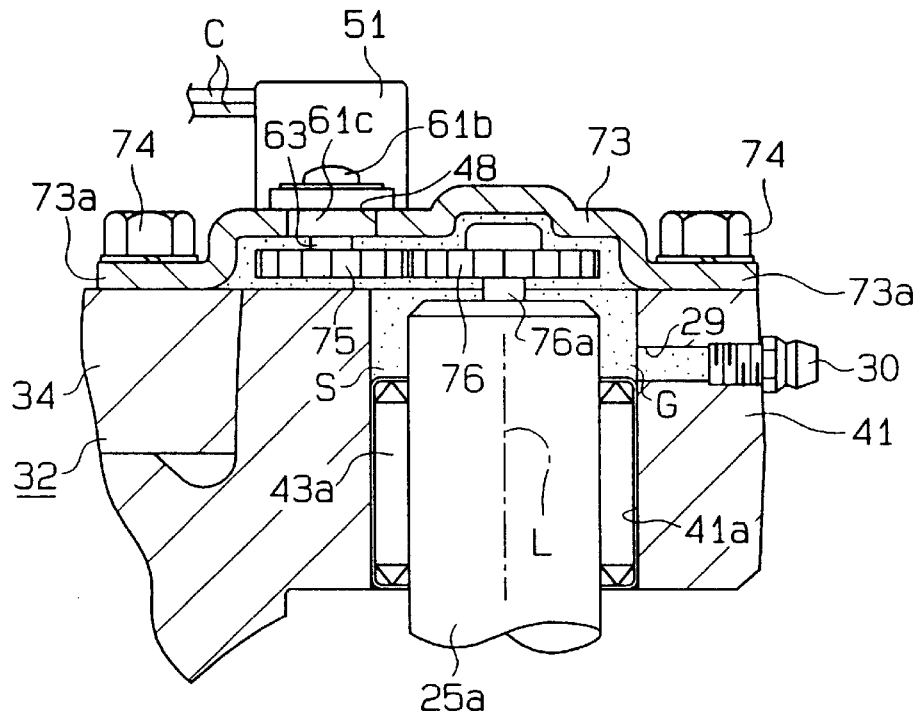
FIG. 10 is an enlarged partial cross-sectional view illustrating a wheel angle sensor and its mounting structure according to a second embodiment.

As shown in FIG. 10, a wheel angle sensor 51 of this embodiment is displaced from axis L of the kingpin 25a toward the middle of the rear axle 32. The sensor 51 is fixed on a bracket 73, which straddles the upper support 41 and the upper plate 34 of the rear axle 32. The bracket 73 includes a flange 73a protruding laterally. The bracket 73 is fixed to the upper plate 34 and the upper support 41 by fastening the flange 73a by bolts 74. The bracket 73, the support hole 41a, the top of the kingpin 25a and the needle bearing 43a define a space S. The space S is filled with grease G, which is forced into the space S through the nipple 30. Seal members (not shown) may be located between the flange 73a and the upper plate 34 and between the flange 73a and the upper support 41 as necessary.

The wheel angle sensor 51 is fixed to the bracket 73 and is displaced from the axis L of the kingpin 25a toward the middle of the rear axle 32. The mounting structure of the sensor 51 and the bracket 73 is the same as that of the embodiment of FIGS. 1–9. The shaft 63 of the sensor 51 protrudes in the space S. A spur gear 75 is secured to the distal end of the shaft 63. A shaft 76a extends from the top of the kingpin 25a and secured to a spur gear 76. The spur gear 76 is meshed with the spur gear 75. The gear ratio of the spur gears 75, 76 is 1:1.

When the rear wheel Ta is steered, the kingpin 25a rotates integrally with the rear wheel Ta. The rotation of the kingpin 25a is transmitted to the shaft 63 by the spur gears 75, 76. As in the embodiment of FIGS. 1–9, the wheel angle controller 51 detects the rotation angle of the kingpin 25a, or the angle of the rear wheel Ta, and sends a signal corresponding to the detected angle to the controller.

If the wheel angle sensor 51 is aligned with the axis L of the kingpin 25a, rear wheels Ta having certain shapes and sizes would interfere with the sensor 51. However, the sensor 51 of FIG. 10, is displaced from the axis L of the kingpin 25a, that is, away from the rear wheel Ta. This prevents the rear wheel Ta from interfering with the sensor 51 thereby increasing the number of allowable shapes and sizes of the rear wheel Ta.

Figure 11:
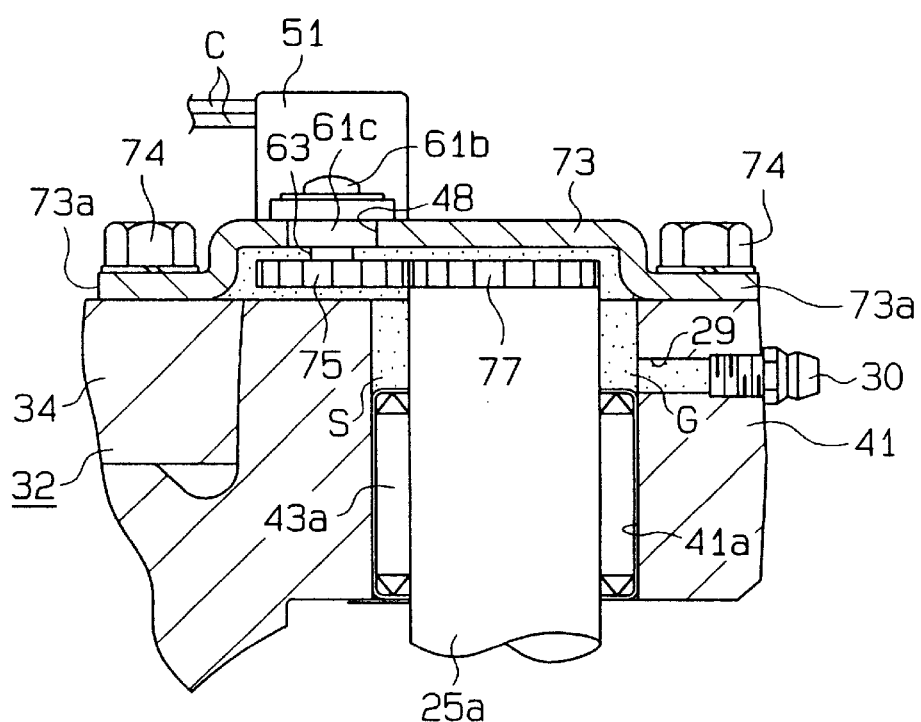
FIG. 11 is an enlarged partial cross-sectional view illustrating a wheel angle sensor and its mounting structure according to a third embodiment.

A third embodiment of the present invention will now be described with reference to FIG. 11. The embodiment of FIG. 11 is a modification of the embodiment of FIG. 10. Specifically, in the embodiment of FIG. 11, a spur gear 77, which is meshed with the spur gear 75 of the sensor 51, is directly formed on the circumference of the top portion of the kingpin 25a, whereas the spur gear 76 of FIG. 10 is separately formed from the kingpin 25a. Thus, the construction of FIG. 11 eliminates any error produced by assembling the gear 76 to the kingpin 25a. The accuracy of wheel angle detection is thus improved.

Figure 12:
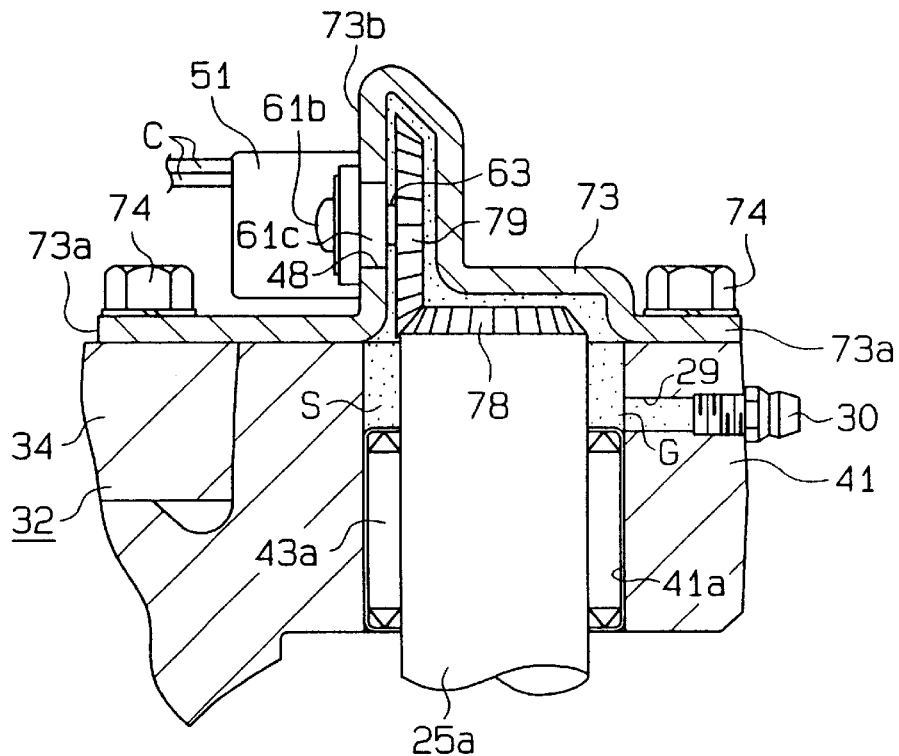
FIG. 12 is an enlarged partial cross-sectional view illustrating a wheel angle sensor and its mounting structure according to a fourth embodiment.

A fourth embodiment of the present invention will now be described with reference to FIG. 12. Instead of the spur gear 77 of FIG. 11, a bevel bear 78 is directly formed on the top circumference of the kingpin 25a. A bracket 73 of FIG. 12 includes a vertical wall 73b. The wheel angle sensor 51 is secured to the vertical wall 73b. The shaft 63 of the sensor 51 protrudes in the bracket 73. A bevel gear 79 is secured to the shaft 63. The bevel gear 79 is arranged perpendicular relative to and is meshed with the bevel gear 78. The gear ratio of the gears 78, 79 is 1:1. The bevel gear 78 may be formed separately from the kingpin 25a.

A fifth embodiment of the present invention will now be described with reference to FIG. 13. Instead of a potentiometer, an absolute type magnetic sensor is used as the wheel angle sensor 51. The wheel angle sensor, or the magnetic sensor 51, is fixed to the top surface of the upper support 41 to face the upper circumference of the kingpin 25a. The sensor 51 has magnetic heads (not shown), which are vertically arranged. A magnetic substance layer 84 is formed on the upper portion of the kingpin 25a to correspond to the magnetic heads of the sensor 51. The layer 84 includes coded magnetic patterns that indicate the rotational angle of the kingpin 25a. The magnetic patterns are equally spaced apart in the rotational direction of the kingpin 25a. The sensor 51 reads a magnetic pattern that faces the magnetic heads for detecting the rotational angle of the kingpin 25a, or the angle of the rear wheel Ta.

A cover 81 covers the kingpin 25a and the wheel angle sensor 51. The peripheral portion of the cover 81 is fastened to the upper plate 34 and the upper support 41 by bolts 74. A ring-like seal 82 is located between the kingpin 25a and the wall of the support hole 41a. A space S is defined by the seal 82 and the needle bearing 43a and is filled with grease G. The seal 82 prevents the grease G from entering the interior of the cover 81, in which the sensor 51 is located.

A non-contact type sensor such as a magnetic sensor is advantageous over a contact type sensor such as potentiometer because the wheel angle sensor 51, which may be a non-contact type sensor, is less susceptible to deterioration with time. Thus, the sensor 51 of FIG. 13 has a long life.

A sixth embodiment of the present invention will now be described with reference to FIG. 14. In this embodiment, the magnetic sensor of FIG. 13 is replaced with an absolute type photoelectric sensor. The wheel angle sensor, or the photoelectric sensor 51, is secured to the top surface of the upper support 41 and faces the upper portion of the kingpin 25a. The sensor 51 includes a light emitter 51a and a light receiver 51b. The light emitter 51a includes light emitting diodes and the light receiver includes silicon diodes.

A flange-like rotor 83 is secured to the upper periphery of the kingpin 25a. The rotor 83 rotates integrally with the kingpin 25a between the light emitter 51a and a light receiver 51b. The rotor 83 has a gray coded slit pattern. The slits are equally spaced apart in the rotational direction of the kingpin 25a and indicate the rotation angle of the kingpin 25a. The wheel angle sensor 51 reads the slit pattern between the light emitter 51a and the light receiver 51b for detecting the rotational angle of the kingpin 25a, or the angle of the rear wheel Ta.

Figure 13:
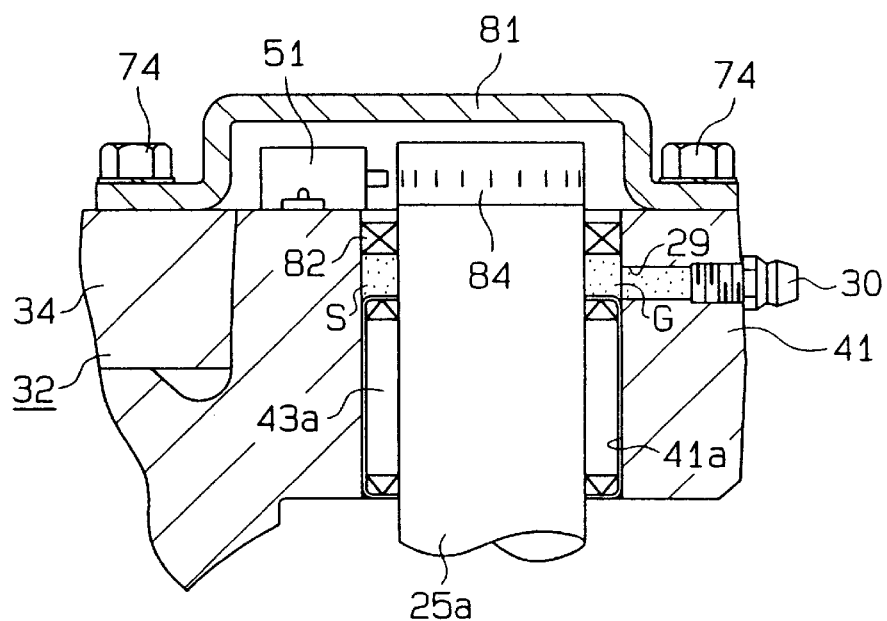
FIG. 13 is an enlarged partial cross-sectional view illustrating a wheel angle sensor and its mounting structure according to a fifth embodiment.
Figure 14:
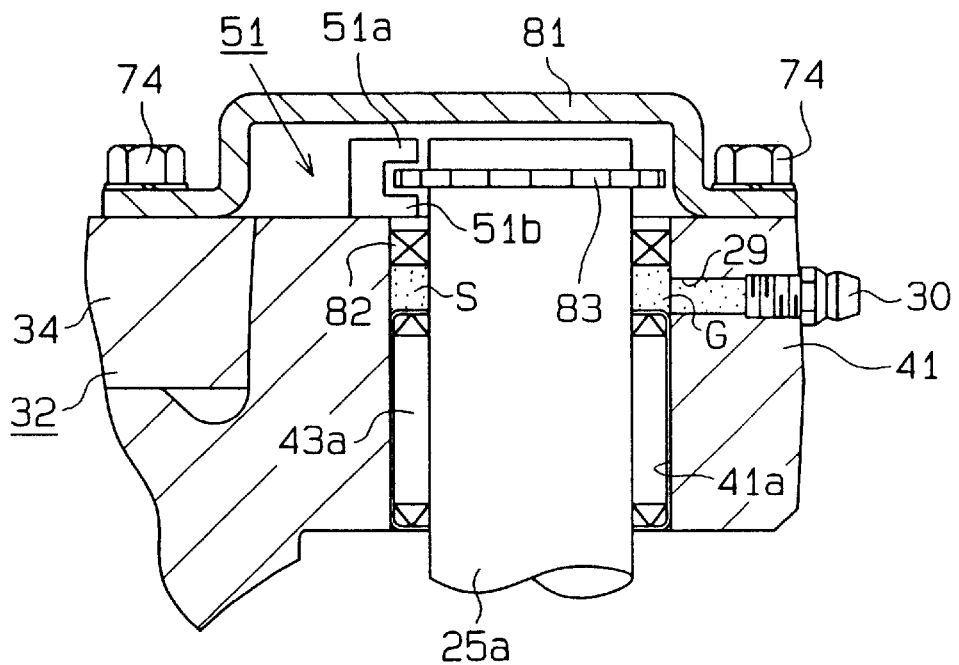
FIG. 14 is an enlarged partial cross-sectional view illustrating a wheel angle sensor and its mounting structure according to a sixth embodiment.

Like the sensor 51 of FIG. 13, the photoelectric sensor 51 of FIG. 14 is a non-contact type sensor and is less susceptible to deterioration with time compared to contact type sensors. Thus, the sensor 51 of FIG. 13 has a long life.

A seventh embodiment of the present invention will now be described with reference to FIG. 15. This embodiment is suitable for relatively large vehicle having large kingpins. In the embodiment of FIGS. 1–9, the wheel angle sensor 51 is provided on the top surface of the bracket 47. In this embodiment (FIG. 15), the sensor 51, which is the same type of sensor as that used in the first embodiment, is provided on the bottom surface of the bracket 47. The kingpin 25a of FIG. 15 has a recess 85 formed in its upper portion. The recess 85 accommodates the sensor 51. The size of the recess 85 is large enough not to interfere with the sensor 51 when the kingpin 25a is rotated. A hole 69 is formed in the bottom of the recess 85. The input shaft 63 of the sensor 51 is engaged with the hole 69.

Figure 15:
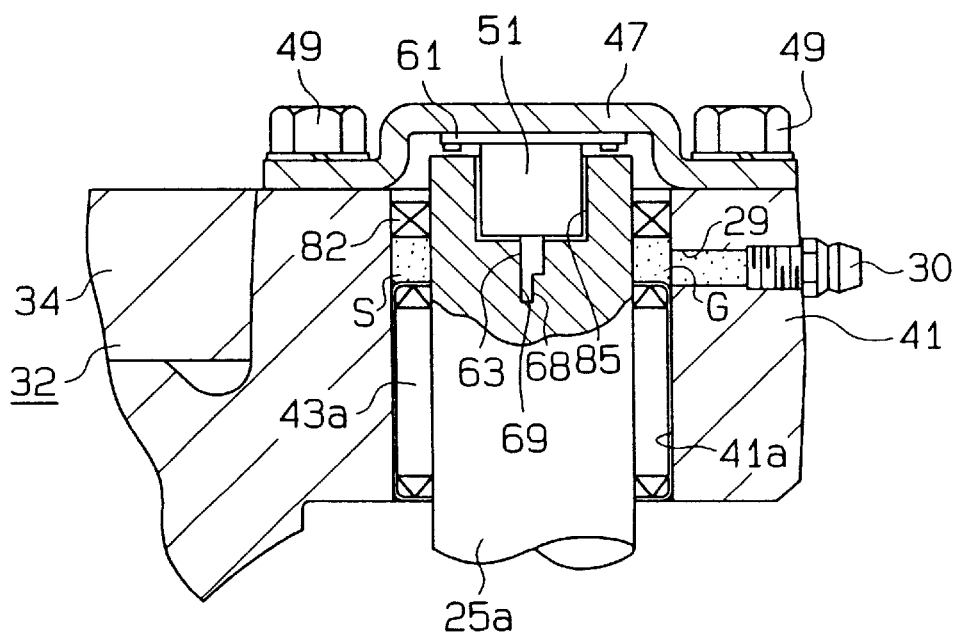
FIG. 15 is an enlarged partial cross-sectional view illustrating a wheel angle sensor and its mounting structure according to a seventh embodiment.

The wheel angle sensor 51 of FIG. 15 is accommodated in the kingpin 25a and does not protrude from the bracket 47. This construction prevents the rear wheel Ta from interfering with the sensor 51 thereby increasing the number of allowable shapes and sizes of the rear wheel Ta.

Figure 16:
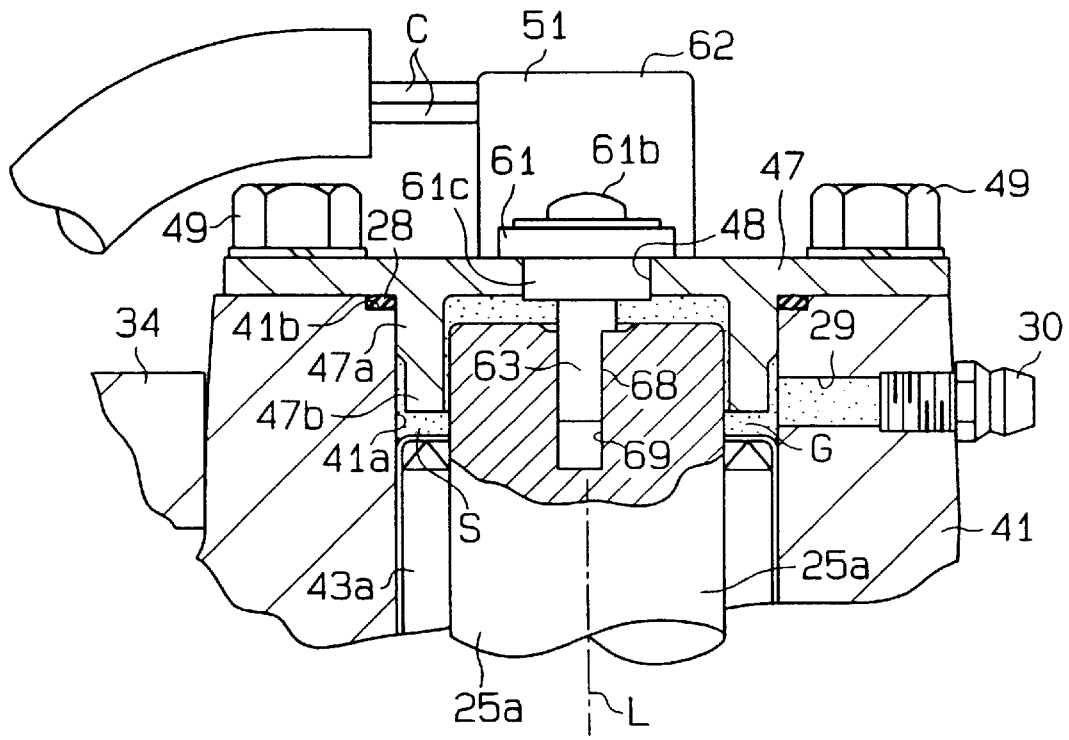
FIG. 16 is an enlarged partial cross-sectional view illustrating a wheel angle sensor and its mounting structure according to an eighth embodiment.

An eighth embodiment of the present invention will now be described with reference to FIG. 16. The embodiment of FIG. 16 is a modification of the embodiment of FIGS. 1–9. The bracket 47 of FIG. 16 includes a cylindrical positioning protrusion 47a protruding downward. The cylinder 47a is coaxial with the positioning hole 48 formed in the bracket 47 and is fitted in the support hole 41a of the support 41. The protrusion 47a include a guide portion 47b. The outer diameter of the guide portion 47b is smaller than that of the rest of the protrusion 47a.

When mating the bracket 47 to the upper support 41, the protrusion 47a is fitted into the support hole 41a. The position of the bracket 47 relative to the support 41 is fixed by inserting the protrusion 47a into the support hole 41a. Simultaneously, the top of the kingpin 25a is inserted in the cylinder 47a. In this state, the axis of the positioning hole 48 is aligned with the axis L of the kingpin 25a, and the position of the wheel angle sensor 51 is fixed relative to the bracket 47. In other words, the axis of the input shaft 63 is accurately aligned with the axis L of the kingpin 25a. A seal 28, which is located at the open end of the support hole 41a, is pressed against the lower surface of the bracket 47 and against the outer surface of the cylinder 47a.

As described above, the bracket 47 of FIG. 16 includes the positioning protrusion 47a for fixing the position of the bracket 47 relative to the support hole 41a. Therefore, when fixing the bracket 47 to the support 41 by the bolts 49, the bracket 47 is not displaced in the radial direction of the kingpin 25a. Such a displacement of the bracket 47 would produces a radial force that acts on the input shaft 63 in the hole 69. This degrades the detection accuracy of the sensor 51 and may cause a malfunction of the sensor 51. However, in the construction of FIG. 16, positioning protrusion 47a prevents the bracket 47 from being radially displaced relative to the support 41a. Thus, the positioning accuracy of the sensor 51 is improved, and any drawbacks caused by the radial displacement will be avoided. This advantage is obtained by simply forming the positioning protrusion 47 on the bracket 47. The embodiment of FIG. 16 is thus easy to carry out.

When assembling the protrusion 47a with the support hole 41a, the. guide portion 47b is initially inserted in the support hole 41a. Since the outer diameter of the guide portion 47b is smaller than that of the support hole 41a, the positioning cylinder 47a is easily inserted in the support hole 41a.

The position of the wheel angle sensor 51 relative to the support hole 41a is fixed by the bracket 47. Therefore, even if the sensor 51 is smaller than the hole 41a, the bracket 47 allows the sensor 51 to be easily and accurately assembled to the support 41.

Further, when the support hole 41a is small, the sensor 51 may be directly fixed to the upper support 41 without the bracket 47. In this case, a part functioning as the positioning protrusion 47a is directly formed on the sensor 51.

The guide portion 47b of the cylinder 47a may have a tapered shape. Further, the guide portion 47b may be omitted.

A positioning portion similar to the cylinder 47a may be formed on the top surface of the upper support 41.

In this case, a recess or a hole for receiving the positioning portion of the support 41 is formed in the bracket 47.

The positioning protrusion 47a does not necessarily have a circular cross-section. For, example, part of the protrusion 47a may be cut away. In a ninth embodiment shown in FIG. 17, a pair of positioning protrusion 47a are formed on the lower surface of the bracket 47. The protrusions 47a are spaced apart by one hundred eighty degrees about the axis of the positioning hole 48 and contact the inner wall of the support hole 41a (see FIG. 16). The number of the positioning protrusions 47a is not limited to two, but may be three or more. In this case, suppose the bracket 47 is divided into two parts by an imaginary plane including the axis of the positioning hole 48, it is preferable that at least one of the positioning protrusions be formed in a part, and at least two of the positioning protrusions be formed in the other part. Even if the cylindrical positioning protrusion 47a of FIG. 16 is replaced with the positioning protrusions 47a such as the ones shown in FIG. 17, the advantages of the embodiment of FIG. 16 are obtained.

Figure 17:
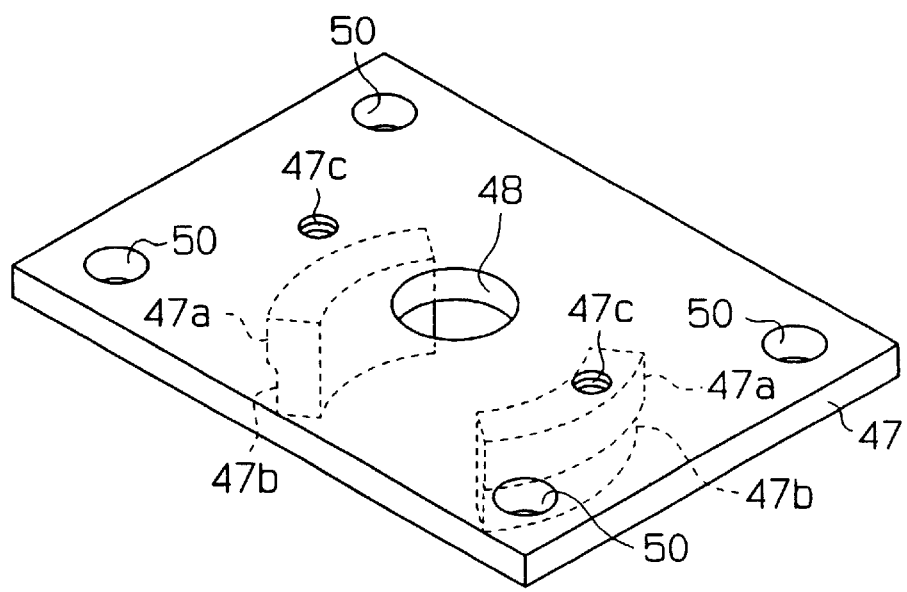
FIG. 17 is a perspective view illustrating a bracket for mounting a wheel angle sensor according to a ninth embodiment.

The positioning protrusions of FIG. 17 may be formed on the brackets 73, 47 of the embodiments of FIGS. 10 to 12 and FIG. 15. Further, in the embodiments of FIGS. 13 and 14, the wheel angle sensors 51 may be fixed to the inner wall of the cover 81. In this case, the cover 81 may include the positioning protrusions 47a shown in FIG. 17.

This construction also improves the positioning accuracy of the sensor 51 and accuracy of wheel angle detection.

Figure 18:
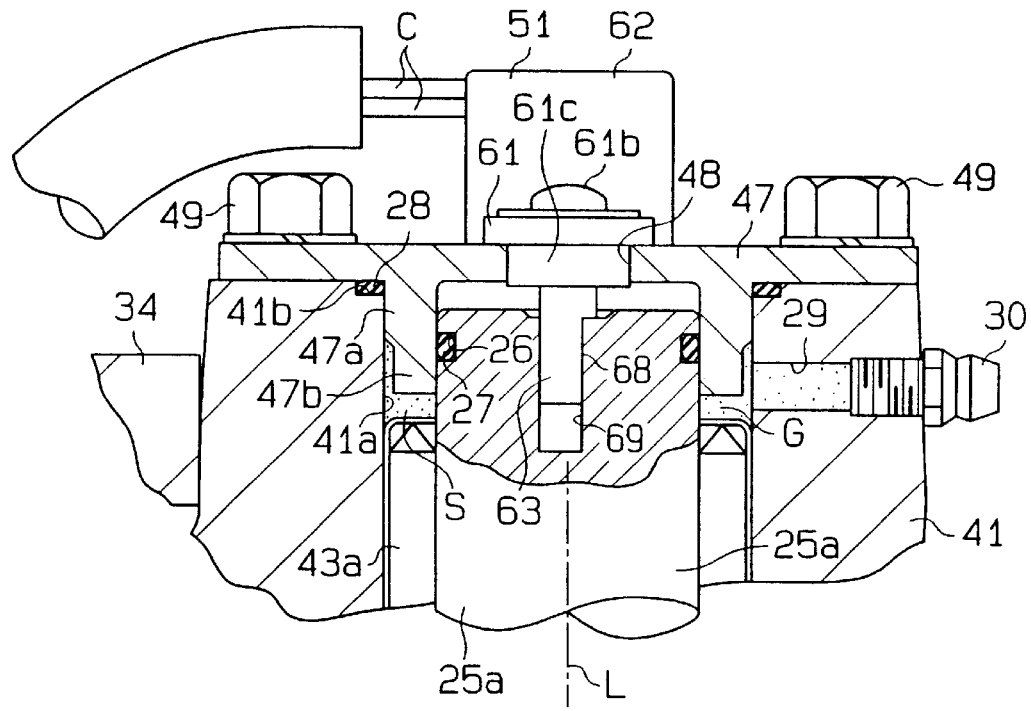
FIG. 18 is an enlarged partial cross-sectional view illustrating a wheel angle sensor and its mounting structure according to a tenth embodiment.

A tenth embodiment of the present invention will now be described with reference to FIG. 18. The embodiment of FIG. 18 is a modification of the embodiment of FIG. 16. In the embodiment of FIG. 18, a ring-like groove 26 is formed in the upper circumference of the kingpin 25a. A seal ring 27 is fitted in the groove 26. The seal ring 27 is made of elastic material such as rubber. The seal ring 27 slidably contacts the inner wall of the positioning projection 47a and seals between the positioning protrusion 47a an the kingpin 25a. The protrusion 47a and the needle bearing 43a define a space S. The space S is filled with grease G. The seal ring 27 prevents the grease G in the space S from entering the interior of the positioning protrusion 47a, or from contacting the shaft 63.

If the grease G enters the interior of the housing 62 through the gap between the shaft 63 and the protrusion 61c, the grease G may cause the sensor 51 to malfunction. 25 However, in this embodiment, the seal ring 27 is located between the positioning protrusion 47a and the kingpin 25a for preventing the grease G from entering the interior of the housing 62. Thus, the sensor 51 does not malfunction but always accurately detects the angle of the rear wheel Ta.

An eleventh embodiment will now be described with reference to FIG. 18. Unlike the embodiment of FIG. 10, a ring-like groove 26 is formed in the inner circumference of the positioning protrusion 47a, and a seal ring 27 is fitted into the groove 26. The seal ring 27 slidably contacts the circumference of the kingpin 25a for sealing between the protrusion 47a and the kingpin 25a.

Figure 19:
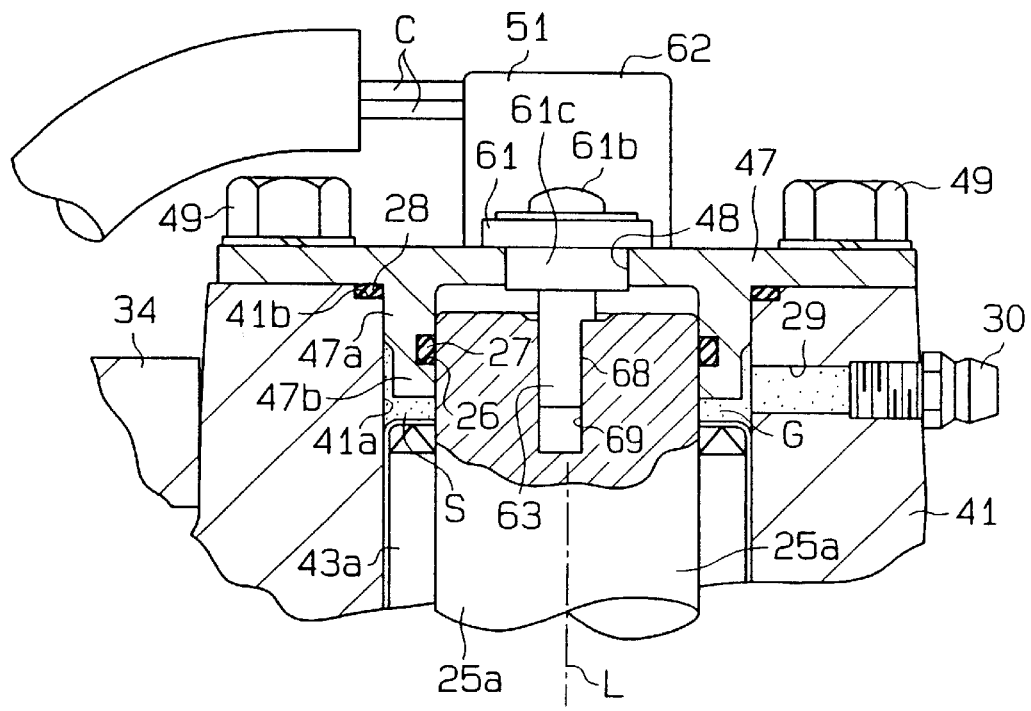
FIG. 19 is an enlarged partial cross-sectional view illustrating a wheel angle sensor and its mounting structure according to an eleventh embodiment.
Figure 20:
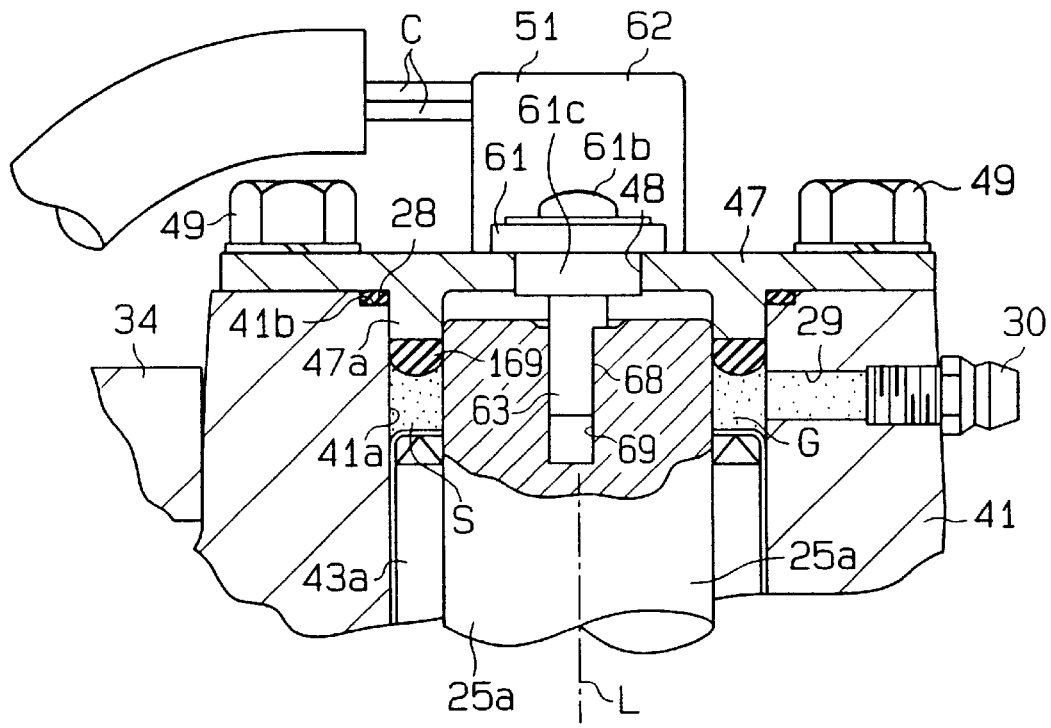
FIG. 20 is an enlarged partial cross-sectional view illustrating a wheel angle sensor and its mounting structure according to a twelfth embodiment.

In a twelfth embodiment shown in FIG. 20, a seal ring 169 is attached to the bottom surface of the positioning protrusion 47a. The seal ring 169 is made of elastic material such as rubber and has a cross-section that is normally wider than the space between the support hole 41a and the kingpin 25a. The inner surface of the seal ring 169 slidably contacts the kingpin 25a while its outer surface is pressed against the inner circumference of the support hole 41a. The embodiment of FIG. 20 has the same advantages as the embodiments of FIG. 18 and FIG. 19. In addition, the embodiment of FIG. 20 requires no groove for receiving the seal ring 169.

The embodiment of FIG. 20 thus simplifies the machining of the support 41 and the kingpin 25a and facilitates the assembly of the seal 169.

Figure 21:
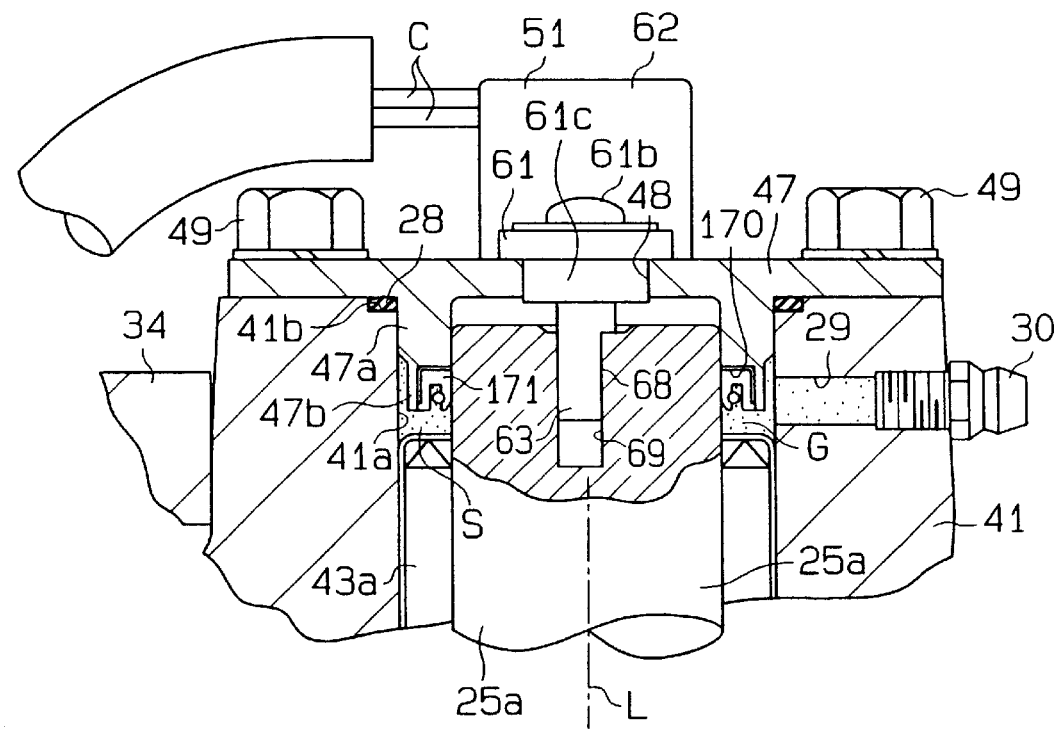
FIG. 21 is an enlarged partial cross-sectional view illustrating a wheel angle sensor and its mounting structure according to a thirteenth embodiment.

In a thirteenth embodiment shown in FIG. 21, a step 170 is formed in the inner circumference of the positioning protrusion 47a. A ring-like oil seal 171 is fitted to the step 170. The oil seal 171 slidably contacts the circumference of the kingpin 25a and seals between the protrusion 47a and the kingpin 25a.

Figure 22:
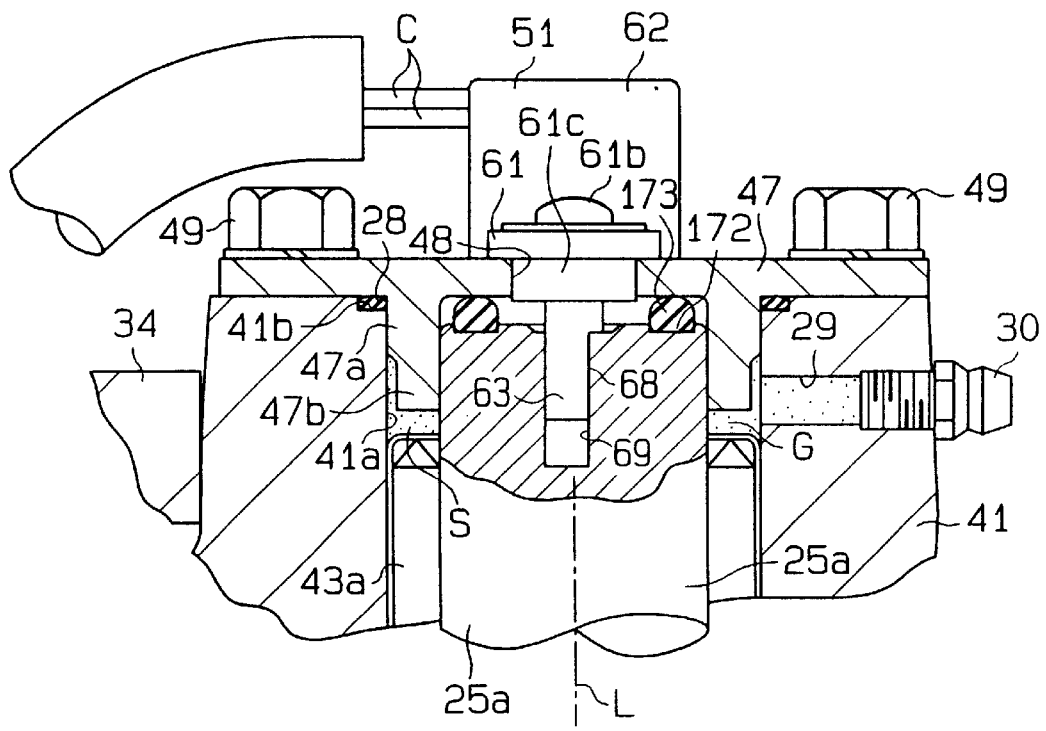
FIG. 22 is an enlarged partial cross-sectional view illustrating a wheel angle sensor and its mounting structure according to a fourteenth embodiment.

In a fourteenth embodiment shown in FIG. 22, a ring-like groove 172 is formed in the top surface of the kingpin 25a. The center of the groove 172 is the axis L of the kingpin 25a. A seal ring 173 made of elastic material is fitted to the groove 172. The seal ring 173 is slidably pressed against the lower surface of the bracket 47 and seals between the bracket 47 and the kingpin 25a. The seal ring 173 therefore prevents grease G from entering the space inside the seal ring 173. In other words, the seal ring 173 prevents the shaft 63 from being exposed to the grease G.

The embodiment of FIG. 22 may be employed in combination with one of the embodiments of FIGS. 18 to 21. In these cases, a double seal structure effectively prevents the grease G from contacting the shaft 63.

Figure 23:
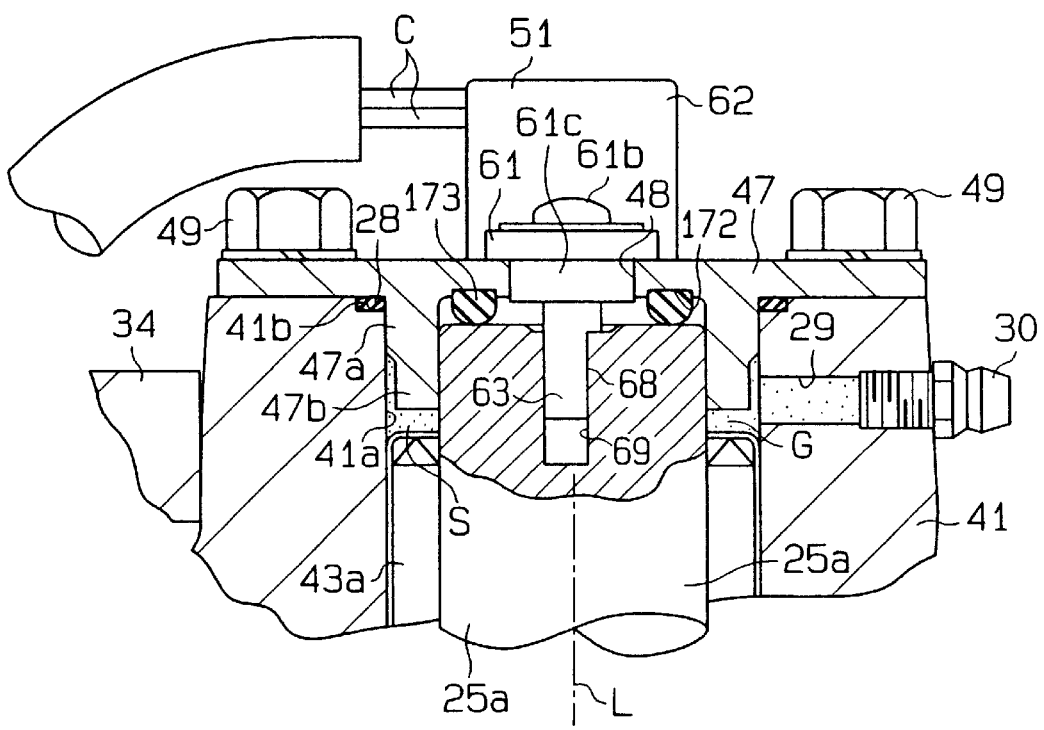
FIG. 23 is an enlarged partial cross-sectional view illustrating a wheel angle sensor and its mounting structure according to a fifteenth embodiment.

Contrary to the embodiment of FIG. 22, a ring groove 172 is formed on the lower surface of the bracket 47 in a fifteenth embodiment shown in FIG. 23. A seal ring 173 is fitted to the groove 172. The seal ring 173 is slidably pressed against the top surface of the kingpin 25a and seals the bracket 47 and the kingpin 25a.

Like the embodiment of FIG. 22, the embodiment of FIG. 23 may be employed in combination with one of the embodiments of FIGS. 18 to 21. In these cases, a double seal structure effectively prevents the grease G from contacting the shaft 63.

In the embodiments of FIGS. 18 to 23, a seal member is located between the bracket 47 (or the positioning protrusion 47a) and the kingpin 25a. However, the positioning protrusions 47a may be separately formed from the bracket 47. Also, the protrusions 47a may be made of elastic material such as rubber and may function as a seal. This construction has the same advantages as the embodiments of FIGS. 18 to 23.

Figure 24:
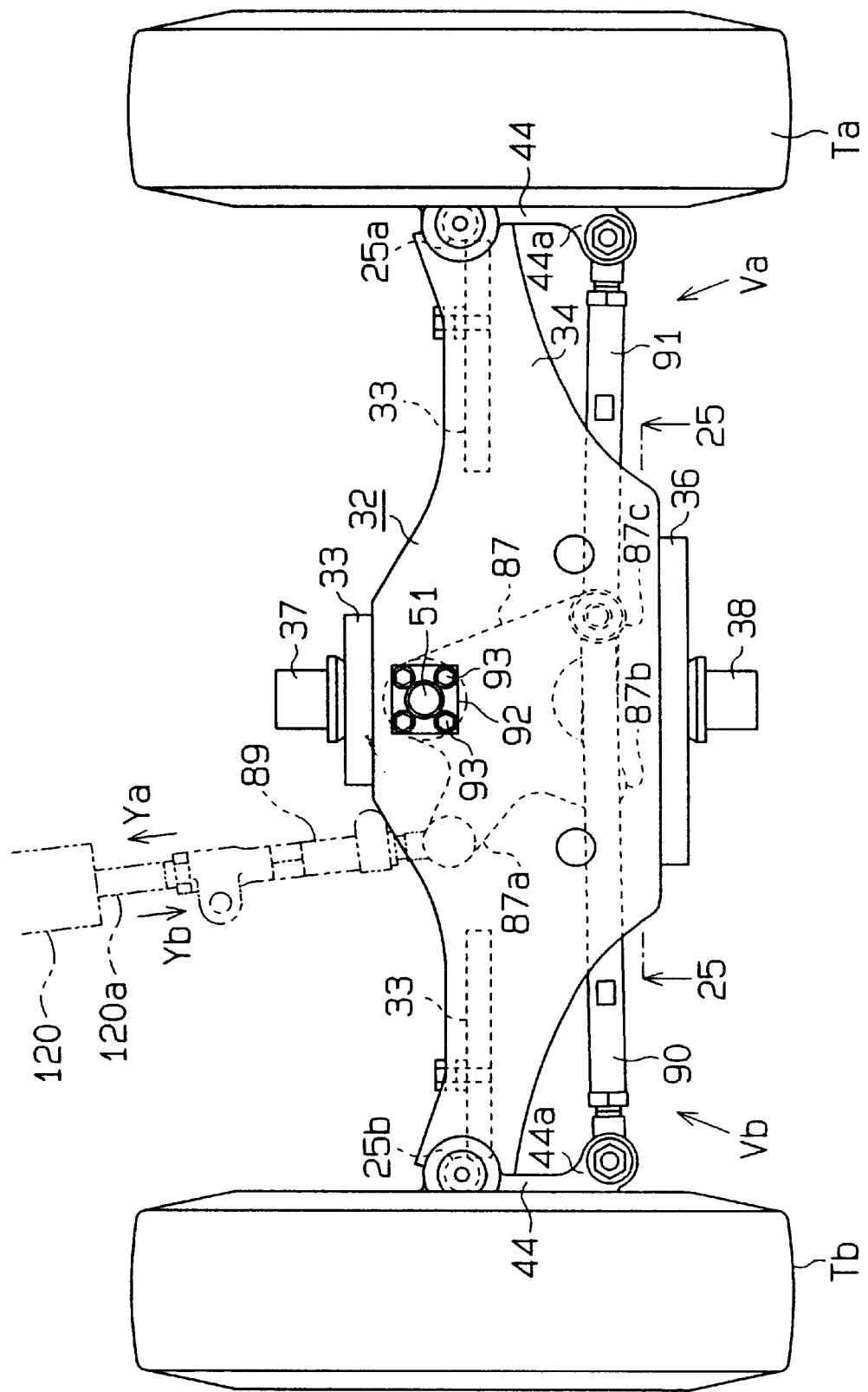
FIG. 24 is a rear view illustrating a rear axle of a forklift and a mounting structure of a wheel angle sensor according to a sixteenth embodiment.
Figure 25:
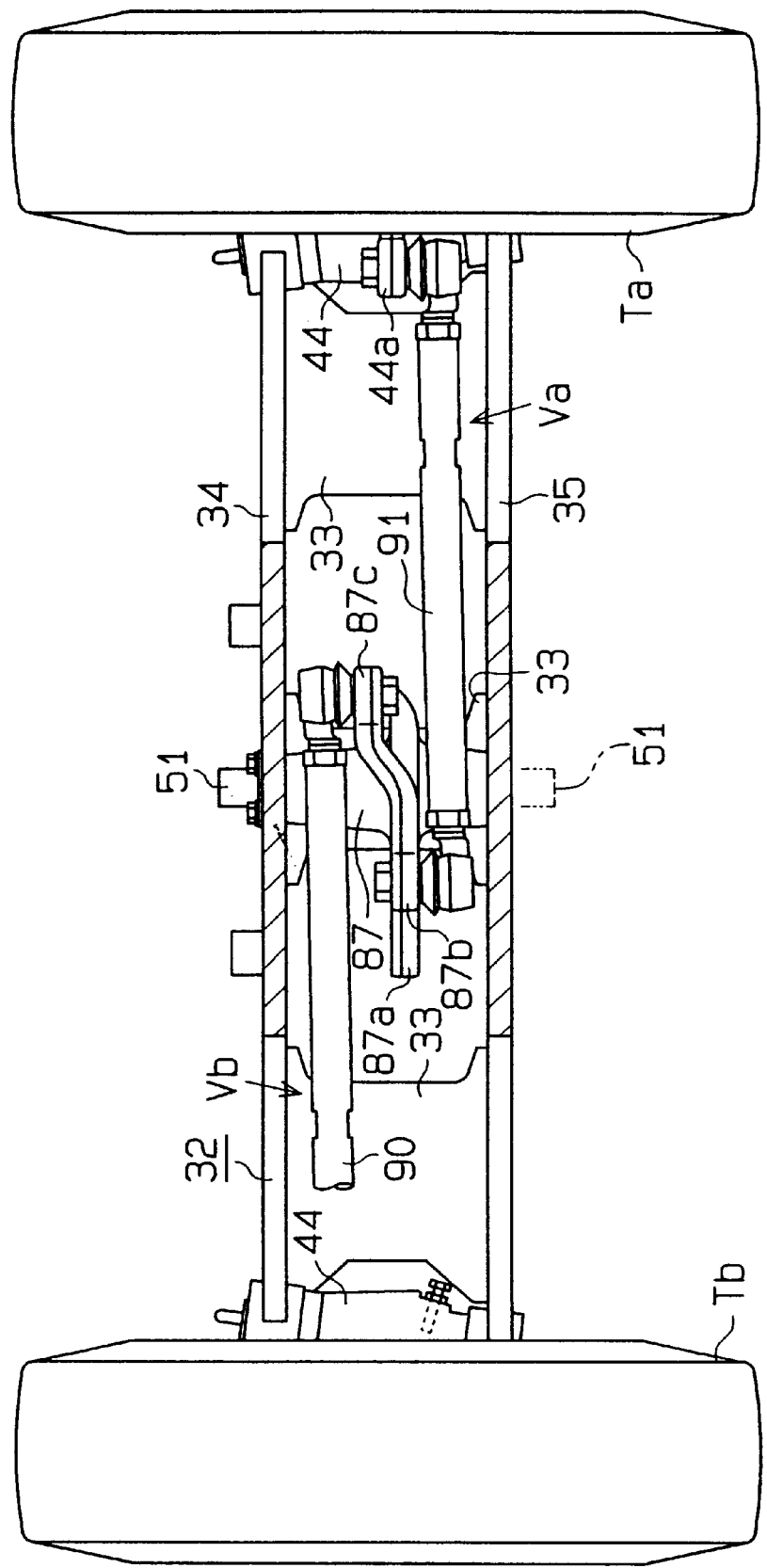
FIG. 25 is a cross-sectional view taken along line 25—25 of FIG. 24.
Figure 26:
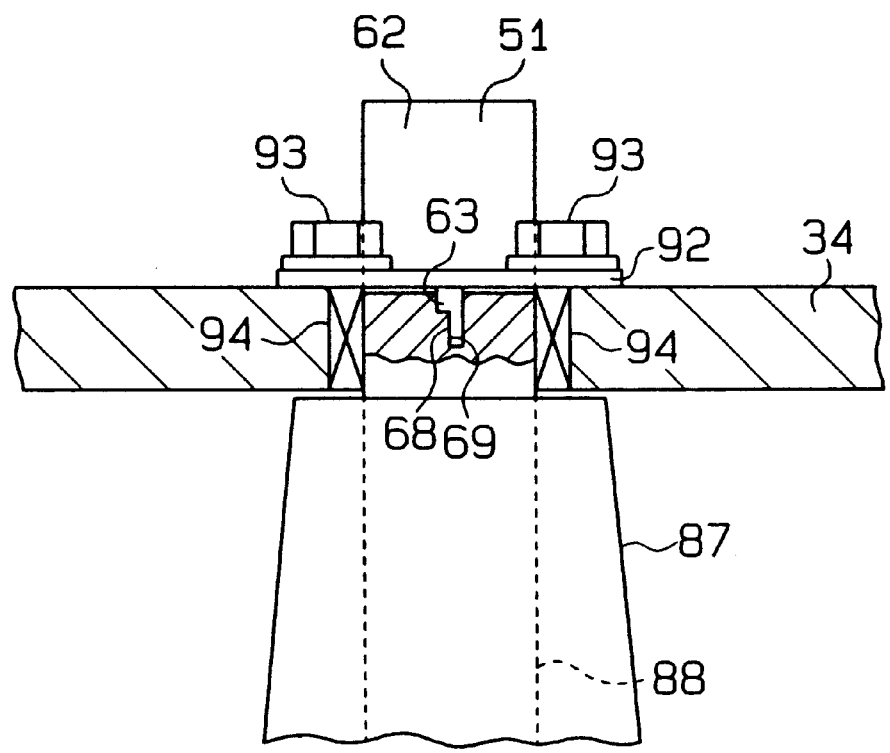
FIG. 26 is an enlarged partial cross-sectional view illustrating the mounting structure of the wheel angle sensor of FIG. 24.

A sixteenth embodiment of the present invention will now be described with reference to FIGS. 24–26. This embodiment relates to a power steering apparatus having a different construction from that of the embodiment of FIGS. 7 and 8. In the embodiment of FIGS. 7 and 8, the-steering cylinder 20 is located in the rear axle 32. The steering cylinder 120 of the embodiment of FIGS. 24 to 26 is located to the front side of the rear axle 32. As shown in FIG. 24, a bell crank 87 is supported in the rear axle 32. A piston rod 120a of the cylinder 120 is coupled to the bell crank 87 by a joint 89.

As shown in FIGS. 24 to 26, the bell crank 87 is pivotally supported between the upper plate 34 and the lower plate 35 by a support shaft 88. The bell crank 87 is fixed to and rotates integrally with the shaft 88. As shown in FIG. 26, the shaft 88 is rotatably supported between the upper plate 34 and the lower plate 35 by bearings 94.

As shown in FIGS. 24 and 25, the bell crank 87 includes a first projection 87a, a second projection 87b and a third projection 87c. The joint 89 is pivotally coupled to the first projection 87a. One end of a coupling rod 91 is pivotally coupled to the second projection 87b. One end of a coupling rod 90 is pivotally coupled to the third projection 87c. Each of rear wheels Ta and Tb is supported by a knuckle 44. Each knuckle 44 has an arm 44a. The rod 90 is pivotally coupled to the arm 44a of the left knuckle 44, which supports the left rear wheel Tb. The rod 91 is pivotally coupled to the arm 44a of the right knuckle 44, which supports the right rear wheel Ta. As described in the embodiment of FIGS. 7 and 8, the left knuckle 44 is fixed to and pivots integrally with the kingpin 25b, and the right knuckle 44 is fixed to and pivots integrally with the kingpin 25a. The joint 89, the bell crank 87, the coupling rods 90, 91, the kingpins 25a, 25b and the knuckles 44 constitute steering mechanisms Va, Vb located between the cylinder 120 and the wheels Ta, Tb.

As shown in FIG. 26, a flat bracket 92 is secured to the upper plate 34 by bolts 93. The position of the bracket 92 corresponds to the position of the support shaft 88 of the bell crank 87. The bracket 92 includes a wheel angle sensor 51. The wheel angle sensor 51 includes a potentiometer and has the same construction as the sensor 51 illustrated in FIG. 1. The sensor 51 is located above the axis of the support shaft 88. The shaft 63 of the sensor 51 is engaged with a hole 69 formed in the top portion of the support shaft 88.

As illustrated by a double-dotted line in FIG. 25, the wheel angle sensor 51 may be provided on the lower plate 35.

As shown in FIG. 24, when the joint 89 is moved by the piston rod 120a of the cylinder 120 in a direction of arrow Ya, the bell crank 87 is rotated clockwise about the shaft 88. This moves the rods 90, 91 leftward. The rods 90, 91 then pivot the knuckles 44 and the rear wheels Ta, Tb clockwise about the kingpins 25a, 25b.

When the joint 89 is moved by the piston rod 120a of the cylinder 120 in a direction of arrow Yb, the bell crank 87 is rotated counterclockwise about the shaft 88. This moves the rods 90, 91 rightward. The rods 90, 91 then pivot the knuckles 44 and the rear wheels Ta, Tb counterclockwise about the kingpins 25a, 25b.

The support shaft 88 rotates integrally with the bell crank 87. Therefore, when the rear wheels Ta, Tb are steered, the wheel angle sensor 51 sends signals indicating the rotational angle of the shaft 88 to a controller (not shown). There is a one-to-one relationship between the rotational angle of the shaft 88 and the angle of the rear wheels Ta, Tb. The controller computes the angle of the rear wheels Ta, Tb based on the rotational angle of the shaft 88 detected by the wheel angle sensor 51.

In this manner, the angle of the rear wheels Ta, Tb can be obtained without detecting the rotational angle of the kingpins 25a, 25b. Instead, the wheel angle is obtained by detecting the rotational angle of a different member, for example, the support shaft 88 of the bell crank 87, that has a one-to-one relationship with the angle of the rear wheel Ta, Tb. Other members that have a one-to-one relationship with the wheel angle include shafts (not shown) that couple the first to third projections 87a, 87b, 87c of the crank 87 with the joint 89 and the rods 90, 91, respectively, and shafts that couple the rods 90, 91 with the knuckles 44. The rotational angle of one of these shafts may be detected by the wheel angle sensor 51. This construction has the same advantages as the embodiment of FIGS. 1–10.

In the embodiment of FIGS. 24 to 26, the mounting structure of the wheel angle sensor 51 is not limited to that of FIG. 26. The mounting constructions of the embodiments of FIGS. 11 to 23 may be employed for the wheel angle sensor 51 of FIGS. 24 to 26.

Although several embodiments of the present invention have been described herein, it should be apparent to those skilled in the art that the present invention may be embodied in many other specific forms without departing from the spirit or scope of the invention. Particularly, it should be understood that the invention may be embodied in the following forms.

In the embodiments of FIGS. 1 to 23, the wheel angle sensor 51 may be located in the vicinity of the left rear wheel Tb for detecting the angle of the left rear wheel Tb. Alternatively, two wheel sensors 51 may be provided, one for each rear wheel Ta, Tb, for detecting the angle of both rear wheels Ta, Tb.

Any type of wheel angle sensors may be employed as long as the sensor detects the rotational angle of a member having a one-to-one relationship with the angle of steered wheels of the vehicle. The detector may be either analog type or digital type.

The present invention may be applied to other types of industrial vehicles, such as a vehicle for high lift work or a truck crane. The present invention may be applied to vehicles other than industrial vehicles. For example, the present invention may be applied to transportation vehicles such as motor trucks, busses, passenger cars and motor, cycles. Further, the application of the present invention is not limited to vehicles and may be embodied in the mounting structure of a rotation sensor provided in any device having a rotating member.

Therefore, the present examples and embodiments are to be considered as illustrative and not restrictive and the invention is not to be limited to the details given herein, but may be modified within the scope and equivalence of the appended claims.

What is claimed is:

1. An apparatus for detecting a wheel angle for use with a vehicle having a vehicle wheel, a manipulating member, an actuator and a steering mechanism, wherein the actuator steers the vehicle wheel with the steering mechanism based on manipulation of the manipulating member, wherein the steering mechanism has a rotating member that rotates in synchronization with the steering of the vehicle wheel, wherein the rotating member is rotatably supported by a collar within a hole formed in a support that is located in the vehicle, and wherein the rotating member pivotally supports the vehicle wheel and the rotating member pivots integrally with the vehicle wheel about a rotational axis, the apparatus comprising:

a fixed detector attached to the support to be operably coupled to the rotating member, said detector detects a wheel angle of the vehicle wheel based on the rotational angle of the rotating member;

a rotatable input shaft extending from the detector, wherein the detector outputs a signal corresponding to a rotational angle of the input shaft, wherein the input shaft extends through the hole and is coupled to the rotating member for integral rotation;

a positioning member located between the support and the detector for fixing the position of the detector in relation to the rotating member, wherein the positioning member comprises a cylindrical body that is fitted to the hole to surround the input shaft, wherein the cylindrical body includes a small diameter portion at its distal end, wherein the diameter of the small diameter portion is smaller than the diameter of the hole.

2. The apparatus according to claim 1, wherein the detector is located on the rotational axis of the rotating member.

3. The apparatus according to claim 1, wherein the detector is offset from the rotational axis of the rotating member.

4. The apparatus according to claim 1, wherein the detector comprises a contact type sensor that is operably connected with the rotating member.

5. The apparatus according to claim 1, wherein the cylindrical body is fitted to the hole such that the rotational axis of the input shaft is aligned with the rotational axis of the rotating member.

6. The apparatus according to claim 5, further comprising a bracket for holding the detector, wherein the bracket is fixed to the support to close the hole, and wherein the cylindrical body protrudes from the bracket.

7. The apparatus according to claim 1, wherein a bearing is located between the hole and the rotating member, wherein a space is defined in the hole for containing lubricant supplied to the bearing, and wherein a seal is provided in the hole for preventing the lubricant from entering the detector.

8. The apparatus according to claim 7, wherein the seal surrounds the input shaft for shutting off the input shaft from the space.

9. The apparatus according to claim 8, further comprising a bracket for holding the detector, wherein the bracket is fixed to the support to close the hole, and wherein the seal is located between the rotational member and the bracket.

10. The apparatus according to claim 9, wherein the cylindrical body protrudes from the bracket, wherein the rotating member includes a distal end that is inserted in the cylindrical body, and wherein the seal is located between the cylindrical body and the distal end of the rotating member.

11. The apparatus according to claim 10, wherein the cylindrical body fixes the position of the detector in relation to the rotating member such that the rotational axis of the input shaft is aligned with the rotational axis of the rotating member.

12. The apparatus according to claim 1, wherein the vehicle comprises a forklift.

13. A mounting structure of a fixed detector that detects a rotation amount of a rotating member, wherein the rotating member is rotatably supported by a collar within a hole formed in a support, wherein the detector is attached to the support to be operably coupled to the rotating member, the structure comprising:

a positioning member located between the support and the detector for fixing the position of the detector in relation to the rotating member, wherein the positioning member comprises a cylindrical body that is fitted to the hole, wherein the cylindrical body includes a small diameter portion at its distal end, wherein the diameter of the small diameter portion is smaller than the diameter of the hole.

14. The structure according to claim 13, wherein the detector includes a rotatable input shaft and outputs a signal corresponding to a rotational angle of the input shaft, wherein the input shaft extends through the hole and is coupled to the rotating member for integral rotation, and wherein the cylindrical body fixes the position of the detector in relation to the rotating member such that the rotational axis of the input shaft is aligned with the rotational axis of the rotating member.

15. The structure according to claim 14, further comprising a bracket for holding the detector, wherein the bracket is fixed to the support to close the hole, wherein the cylindrical body protruding from the bracket to engage with the hole, wherein the cylindrical body surrounds the input shaft.

16. A mounting structure of a fixed detector that detects a rotation amount of a rotating member, wherein the rotating member is rotatably supported by a collar within a hole formed in a support, wherein the detector is attached to the support to extend through the hole and to be operably coupled to the rotating member, the structure comprising:

a positioning member located between the support and the detector for fixing the position of the detector in relation to the rotating member, wherein the positioning member comprises a cylindrical body that is fitted to the hole, wherein the cylindrical body includes a small diameter portion at its distal end, wherein the diameter of the small diameter portion is smaller than the diameter of the hole;

a bearing located between the hole and the rotating member, wherein a space is defined in the hole for containing lubricant supplied to the bearing; and a seal provided in the hole for separating the lubricant from the detector.

17. The structure according to claim 16, wherein the detector includes a rotatable input shaft and outputs a signal corresponding to a rotational angle of the input shaft, and wherein the input shaft extends through the hole and is coupled to the rotating member for integral rotation, and wherein the seal surrounds the input shaft for shutting off the input shaft from the space.

18. The structure according to claim 17, further comprising a bracket for holding the detector, wherein the bracket is fixed to the support to close the hole, and wherein the seal is located between the rotational member and the bracket.

19. The structure according to claim 18, wherein the protrudes from the bracket and surrounds the input shaft, wherein the rotating member includes a distal end that is inserted in the cylindrical body, and wherein the seal is located between the cylindrical body and the distal end of the rotating member.

20. An industrial vehicle comprising:

a wheel;

a manipulating member;

an actuator;

a steering mechanism, wherein the actuator steers the wheel with the steering mechanism based on manipulation of the manipulating member, wherein the steering mechanism includes:

a bell crank that is coupled to and is rotated by the actuator;

a connector that couples the bell crank with the wheel for steering the wheel by rotation of the bell crank; and a shaft that rotates in synchronization with the steering of the wheel, wherein the shaft pivotally couples the bell crank to the vehicle, and wherein the shaft is integrally rotated with the bell crank; and a fixed detector operably coupled to the shaft, wherein the detector detects a wheel angle of the wheel based on the rotational angle of the shaft.

* * * * *

UNITED STATES PATENT AND TRADEMARK OFFICE
CERTIFICATE OF CORRECTION

PATENT NO. : 6,293,022 B1
DATED : September 25, 2001
INVENTOR(S) : Kenji Chino et al.

It is certified that error appears in the above-identified patent and that said Letters Patent is hereby corrected as shown below:

Column 2,
Lines 47-48, please change "a forklift on a wheel angle sensor" to -- a forklift on which a wheel angle sensor --;

Column 7,
Line 36, please change "one of the-kingpins (25a)" to -- one of the kingpins (25a) --;
Line 54, please change "would otherwise-be" to -- would otherwise be --;
Lines 55-56, there should be no new paragraph, please change:
"the sensor 51.

Therefore, the rotation angle" to -- the sensor 51. Therefore, the rotation angle --;

Column 8,
Line 41, please change "sensor 51 of FIG. 10, is displaced" to -- sensor 51 of FIG. 10 is displaced --;

Column 11,
Lines 24-25, there should be no new paragraph, please change:
"in FIG 17.

This construction also improves" to -- in FIG 17. This construction also improves --;

Lines 44-45, please change "to malfunction. 25 However," to
-- to malfunction. However, --;

Signed and Sealed this

Twelfth Day of March, 2002

Attest:

Attesting Officer

JAMES E. ROGAN
*Director of the United States Patent and Trademark Office*